United States Patent
Olsson et al.

(12) 
(10) Patent No.: US 12,200,651 B2
(45) Date of Patent: Jan. 14, 2025

(54) AMF RE-ALLOCATION SOLUTION WITH NETWORK SLICE ISOLATION

(71) Applicant: Telefonaktiebolaget LM Ericsson (publ), Stockholm (SE)

(72) Inventors: Lasse Olsson, Träslövsläge (SE); Qian Chen, Mölndal (SE); Peter Ramle, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 348 days.

(21) Appl. No.: 17/638,851

(22) PCT Filed: Aug. 18, 2020

(86) PCT No.: PCT/EP2020/073063
§ 371 (c)(1),
(2) Date: Feb. 27, 2022

(87) PCT Pub. No.: WO2021/037604
PCT Pub. Date: Mar. 4, 2021

(65) Prior Publication Data
US 2022/0303935 A1    Sep. 22, 2022

Related U.S. Application Data

(60) Provisional application No. 62/893,623, filed on Aug. 29, 2019.

(51) Int. Cl.
*H04W 60/04*        (2009.01)
*H04W 12/06*        (2021.01)
(Continued)

(52) U.S. Cl.
CPC .......... *H04W 60/04* (2013.01); *H04W 12/06* (2013.01); *H04W 40/34* (2013.01); *H04W 48/18* (2013.01)

(58) Field of Classification Search
CPC ..... H04W 60/04; H04W 12/06; H04W 40/34; H04W 48/18
(Continued)

(56) References Cited

U.S. PATENT DOCUMENTS

2018/0332523 A1* 11/2018 Faccin .............. H04W 36/0033
2019/0199802 A1*  6/2019 Zhu ........................ H04W 76/19
(Continued)

FOREIGN PATENT DOCUMENTS

WO    WO-2018175498 A1 *  9/2018 ............ H04W 28/20

OTHER PUBLICATIONS

International Search Report and Written Opinion of the International Searching Authority, PCT/EP2020/073063, mailed Oct. 13, 2020, 12 pages.
(Continued)

*Primary Examiner* — Xuan Lu
(74) *Attorney, Agent, or Firm* — Sage Patent Group

(57) ABSTRACT

Systems and methods are disclosed herein for Access and Mobility Function (AMF) re-allocation. In one embodiment, a method for AMF re-allocation includes, at an initial AMF, receiving a registration request for a User Equipment (UE) from a Radio Access Network (RAN), deciding to initiate an AMF re-allocation procedure, sending the registration request to the RAN for delivery to a target AMF for the AMF re-allocation procedure, and sending a UE security context of the UE to another Network Function (NF). The method further includes, at the target AMF, receiving a message from the RAN wherein the message includes the registration request from the UE, obtaining the UE security context of the UE from the other NF, and performing protected NAS signaling related to a registration procedure for the UE using the UE security context of the UE.

16 Claims, 13 Drawing Sheets

(51) Int. Cl.
*H04W 12/08* (2021.01)
*H04W 36/00* (2009.01)
*H04W 36/06* (2009.01)
*H04W 40/34* (2009.01)
*H04W 48/18* (2009.01)

(58) Field of Classification Search
USPC .......................................................... 370/329
See application file for complete search history.

(56) References Cited

U.S. PATENT DOCUMENTS

| | | | |
|---|---|---|---|
| 2021/0051468 A1* | 2/2021 | Baskaran | H04W 48/16 |
| 2021/0084582 A1* | 3/2021 | Li | H04W 24/02 |
| 2022/0174580 A1* | 6/2022 | You | H04W 12/102 |
| 2022/0201638 A1* | 6/2022 | Arrobo Vidal | H04W 48/08 |

OTHER PUBLICATIONS

3rd Generation Partnership Project; Technical Specification Group Services and System Aspects; Procedures for the 5G System; Stage 2 (Release 15) 3GPP TS 23.502 V15.5.1 (Apr. 2019) 354 pages.

3rd Generation Partnership Project; Technical Specification Group Services and System Aspects; System Architecture for the 5G System; Stage 2 (Release 15) 3GPP TS 23.501 V15.5.0 (Mar. 2019) 241 pages.

3rd Generation Partnership Project; Technical Specification Group Services and System Aspects; Non-Access-Stratum (NAS) protocol for 5G System (5GS); Stage 3 (Release 16) 3GPP TS 24.501 V16.1.0 (Jun. 2019) 541 pages.

3rd Generation Partnership Project; Technical Specification Group Services and System Aspects; Security architecture and procedures for 5G system (Release 15) 3GPP TS 33.501 V15.5.0 (Jun. 2019) 190 pages.

3GPP TSG-SA WG2 Meeting #128bis S2-1811310 Dongguan, P.R. China, Oct. 15-19, 2018 (Revision of S2-1810250) Excluding sensitive information to be sent in clear (XP051540150) 24 pages.

3GPP TSG-SA WG2 Meeting #131 S2-1902677 Feb. 25-Mar. 1, 2019, Tenerife, Spain Introducing Non-public network (XP051611090) 52 pages.

3GPP TSG-SA WG3 Meeting #96 S3-192887 Wroclaw, Poland, Aug. 26-30, 2019 revision of S3-19xabc Discussion about the AMF re-allocation due to slicing (XP051776720) 10 pages.

3GPP TSG-SA WG3 Meeting #96 Wroclaw, Poland, Aug. 26-30, 2019 53-192888 revision of S3-19xabc AMF Reallocation and Slicing (XP051776721) 3 pages.

* cited by examiner

AMF RE-ALLOCATION SOLUTION WITH NETWORK SLICE ISOLATION

RELATED APPLICATIONS

This application claims the benefit of provisional patent application Ser. No. 62/893,623, filed Aug. 29, 2019, the disclosure of which is hereby incorporated herein by reference in its entirety.

TECHNICAL FIELD

The present disclosure relates to allocation of a network function in a core network of a cellular communications system.

BACKGROUND

When an Access and Mobility Function (AMF) identifies that the registering User Equipment (UE) should be served by another network slice, the AMF reallocation procedure is triggered. To maintain network slice isolation, the initial AMF and the target AMF for the AMF reallocation should have no direct contact. Further, to maintain a balanced AMF set in which the target AMF is included, reallocation via (Radio) Access Network ((R)AN) should be used.

The solution to handle this is currently described in e.g. Third Generation Partnership Project (3GPP) Technical Specification (TS) 23.502 v.15.6.0, which is reproduced below:

4.2.2.2.3 Registration with AMF re-allocation

When an AMF receives a Registration request, the AMF may need to reroute the Registration request to another AMF, e.g. when the initial AMF is not the appropriate AMF to serve the UE. The Registration with AMF re-allocation procedure, described in figure 4.2.2.2.3-1, is used to reroute the NAS message of the UE to the target AMF during a Registration procedure.

[REPRODUCED AS FIGURES 1A AND 1B

Figure 4.2.2.2.3-1: Registration with AMF re-allocation procedure

The initial AMF and the target AMF register their capability at the NRF.

1. Steps 1 and 2 of figure 4.2.2.2.2-1 have occurred, and the (R)AN sends the Registration request message within an Initial UE message to the initial AMF.

2. If the AMF needs the SUPI and/or UE's subscription information to decide whether to reroute the Registration Request or if the Registration Request was not sent integrity protected or integrity protection is indicated as failed, then AMF performs steps 4 to 9b of figure 4.2.2.2.2-1.

3a. [Conditional] If the initial AMF needs UE's subscription information to decide whether to reroute the Registration Request and UE's slice selection subscription information was not provided by old AMF, the AMF selects a UDM as described in TS 23.501 [2], clause 6.3.8.

3b. Initial AMF to UDM: Nudm_SDM_Get (SUPI, Slice Selection Subscription data).

The initial AMF request UE's Slice Selection Subscription data from UDM by invoking the Nudm_SDM_Get (see clause 5.2.3.3.1) service operation. UDM may get this information from UDR by Nudr_DM_Query(SUPI, Subscribed S-NSSAIs).

3c. UDM to initial AMF: Response to Nudm_SDM_Get. The AMF gets the Slice Selection Subscription data including Subscribed S-NSSAIs. The UDM may provide indication that the subscription data for network slicing is updated for the UE.

UDM responds with slice selection data to initial AMF.

4a. [Conditional] Initial AMF to NSSF: Nnssf_NSSelection_Get (Requested NSSAI, [Mapping Of Requested NSSAI], Subscribed S-NSSAI(s) with the default S-NSSAI indication, TAI, Allowed NSSAI for the other access type (if any), [Mapping of Allowed NSSAI], PLMN ID of the SUPI).

If there is a need for slice selection, (see clause 5.15.5.2.1 of TS 23.501 [2]), e.g. the initial AMF cannot serve all the S-NSSAI(s) from the Requested NSSAI permitted by the subscription information, the initial AMF invokes the Nnssf_NSSelection_Get service operation from the NSSF by including Requested NSSAI, optionally Mapping Of Requested NSSAI, Subscribed S-NSSAIs with the default S-NSSAI indication, Allowed NSSAI for the other access type (if any), Mapping of Allowed NSSAI, PLMN ID of the SUPI and the TAI of the UE.

4b. [Conditional] NSSF to Initial AMF: Response to Nnssf_NSSelection_Get (AMF Set or list of AMF addresses, Allowed NSSAI for the first access type, [Mapping Of Allowed NSSAI], [Allowed NSSAI for the second access type], [Mapping of Allowed NSSAI], [NSI ID(s)], [NRF(s)], [List of rejected (S-NSSAI(s), cause value(s))], [Configured NSSAI for the Serving PLMN], [Mapping Of Configured NSSAI]).

The NSSF performs the steps specified in point (B) in clause 5.15.5.2.1 of TS 23.501 [2]. The NSSF returns to initial AMF the Allowed NSSAI for the first access type, optionally the Mapping Of Allowed NSSAI, the Allowed NSSAI for the second access type (if any), optionally the Mapping of Allowed NSSAI and the target AMF Set or, based on configuration, the list of candidate AMF(s). The NSSF may return NSI ID(s) associated to the Network Slice instance(s) corresponding to certain S-NSSAI(s). The NSSF may return the NRF(s) to be used to select NFs/services within the selected Network Slice instance(s). It may return also information regarding rejection causes for S-NSSAI(s) not included in the Allowed NSSAI. The NSSF may return Configured NSSAI for the Serving PLMN, and possibly the associated mapping of the Configured NSSAI.

NOTE: The NRF(s) returned by the NSSF, if any, belong to any level of NRF (see clause 6.2.6 of TS 23.501 [2]) according to the deployment decision of the operator.

5. [Conditional] Initial AMF to old AMF: Namf_Communication_RegistrationCompleteNotify (failure cause ).

The initial AMF decides to reroute the NAS message to another AMF. The initial AMF sends a reject indication to the old AMF telling that the UE Registration procedure did not fully complete at the initial AMF. The old AMF continues as if the Namf_Communication_UEContextTransfer had never been received.

6a. [Conditional] Initial AMF to NRF: Nnrf_NFDiscovery_Request (NF type, AMF Set).

If the initial AMF does not locally store the target AMF address, and if the initial AMF intends to use direct reroute to target AMF or the reroute via (NG-R)AN message needs to include AMF address, then the initial AMF invokes the Nnrf_NFDiscovery_Request service operation from the NRF to find a proper target AMF which has required NF capabilities to serve the UE. The NF type is set to AMF. The AMF Set is included in the Nnrf_NFDiscovery_Request.

6b. [Conditional] NRF to AMF: Response to Nnrf_NFDiscovery_Request (list of (AMF pointer, AMF address, plus additional selection rules and NF capabilities)).

The NRF replies with the list of potential target AMF(s). The NRF may also provide the details of the services offered by the candidate AMF(s) along with the notification end-point for each type of notification service that the selected AMF had registered with the NRF, if available. As an alternative, it provides a list of potential target AMFs and their capabilities, and optionally, additional selection rules. Based on the information about registered NFs and required capabilities, a target AMF is selected by the initial AMF.

If the initial AMF is not part of the target AMF set, and is not able to get a list of candidate AMF(s) by querying the NRF with the target AMF set (e.g. the NRF locally pre-configured on AMF does not provide the requested information, the query to the appropriate NRF provided by the NSSF is not successful, or the initial AMF has knowledge that the initial AMF is not authorized as serving AMF etc.) then the initial AMF shall forward the NAS message to the target AMF via (R)AN executing step 7(B); the Allowed NSSAI and the AMF Set are included to enable the (R)AN to select the target AMF as described in TS 23.501 [2] clause 6.3.5.

7(A). If the initial AMF, based on local policy and subscription information, decides to forward the NAS message to the target AMF directly, the initial AMF invokes the Namf_Communication_N1MessageNotify to the target AMF, carrying the rerouted NAS message. The Namf_Communication_N1MessageNotify service operation includes the information enabling (R)AN to identify the N2 terminating point, and the full Registration Request message, and the UE's SUPI and MM Context if available. If the initial AMF has obtained the information from the NSSF as described at step 4b, that information except the AMF Set or list of AMF addresses is included. The target AMF then updates the (R)AN with a new updated N2 termination point for the UE in the first message from target AMF to RAN in step 8.

7(B). If the initial AMF, based on local policy and subscription information, decides to forward the NAS message to the target AMF via (R)AN unless the target AMF(s) are returned from the NSSF and identified by a list of candidate AMF(s), the initial AMF sends a Reroute NAS message to the (R)AN (step 7a). The Reroute NAS message includes the information about the target AMF, and the full Registration Request message. If the initial AMF has obtained the information as described at step 4b, that information is included. The (R)AN sends the Initial UE message to the target AMF (step 7b) indicating reroute due to slicing including the information from step 4b that the NSSF provided.

8. After receiving the Registration Request message transmitted at step 7(A)a or step 7(B)b, if no UE context is received from the initial AMF, the target AMF, based on rerouting due to slicing, continues with the Registration procedure from step 4 until 22 of figure 4.2.2.2.2-1 (with the target AMF corresponding to the new AMF). If the UE context is received from the initial AMF, the target AMF continues with the Registration procedure from step 8 or step 9b (depending on whether it decides to re-authenticate the UE) or step 9c (if new NAS security context shall be applied) until step 22 of figure 4.2.2.2.2-1, skipping step 10. If the initial AMF decides to forward the NAS message to the target AMF (step 7(A), the first message from the target AMF to RAN (either Initial Context Setup Request, or Downlink NAS Transport) contain the AMF name of the initial AMF.

The solution described in 3GPP TS 23.502 v.15.6.0, Section 4.2.2.2.3 is flawed and will not work due to shared security between the UE and the initial AMF. More specifically, the current solution options depicted in 3GPP TS 23.502 v.15.6.0, Section 4.2.2.2.3 does not:

A) For case A (see case A in FIG. 1B), fulfill the security requirement on a system with respect to network slice isolation;

B) For case B (see case B in FIG. 1B), work at all as the UE will never be able to register in the Fifth Generation Core (5GC) as the UE will discard any "plain text"/unprotected messages from the target AMF (e.g. the Authentication Request message). The reason why the target AMF sends this message unprotected is due to the fact that the UE Security context is not available in the target AMF.

FIG. 2 illustrates a registration failure case 1 in the registration procedure with AMF reallocation. The steps of this registration failure case 1 are as follows:

Step 200: UE sends a Registration Request with Subscription Concealed Identifier (SUCI).

Step 202: Initial AMF, upon the reception of the Registration Request with SUCI, initiates the primary authentication with UE. Initial AMF and UE separately generate a new AMF key, denoted as Kamf_new.

Step 204: Initial AMF sends the Non-Access Stratum (NAS) Security Mode Command to the UE. The UE replies with NAS Security Mode Complete message which contains a complete Registration Request message, as specified in clause 6.4.6 of TS 33.501.

Step 206: Initial AMF, based on the requested Single-Network Slice Assistance Information (S-NSSAI) IEs (included in Requested NSSAI) obtained from the complete Registration Request message in NAS Security Mode Complete message in step 204, decides to reroute the Registration Request, received in step 200, to Target AMF. The selection of Target AMF (e.g. AMF set) can be obtained by requesting Network Slice Selection Function (NSSF). For the detailed procedure of AMF relocation, refer to clause 4.2.2.2.3 of TS 23.502 [1].

Step 208: Initial AMF reroutes the received Registration Request in step 200 to Target AMF, via (R)AN. This occurs when Initial AMF has no interface with Target AMF (thus enabling Network slice isolation).

Step 210: Target AMF initiates primary authentication. Target AMF fetches Random Challenge (RAND), Authentication Token (AUTN), and other parameters from AUSF.

Step 212: Target AMF sends Authentication Request message to UE. As Target AMF possesses no NAS security context, Authentication Request message is sent with no NAS security protection. UE, upon the reception of the unprotected Authentication Request message, will discard it. This is because UE has NAS security established with Initial AMF and it is unaware of the AMF reallocation, and hence UE will discard any unprotected NAS messages, as specified in clause 4.4.4.2 and 4.4.5 of 24.501:

"Once the encryption of NAS messages has been started between the AMF and the UE, the receiver shall discard the unciphered NAS messages which shall have been ciphered according to the rules described in this specification."

"Once the secure exchange of NAS messages has been established, the receiving 5GMM entity in the UE shall not process any NAS signalling messages unless they have been successfully integrity checked by the NAS. If NAS signalling messages, having not successfully passed the integrity check, are received, then the NAS in the UE shall discard that message."

Eventually the registration will fail after timeout. Later, if UE registers again, the above procedure applies and registration will never be successful.

This problem is also illustrated in FIG. 3. As illustrated, the RAN uses its logic and sends a registration request from a UE to a default AMF (step 300). The AMF authenticates the UE and creates a UE security context (step 302). The UE accepts, sends a complete Non-Access Stratum (NAS) message, and starts to only accept secure messages over NAS (step 304). The AMF fetches network slice data (step 306), and the AMF validates network slices with the Network Slice Selection Function (NSSF) (step 308). In this example, the AMF cannot support the network slices indicated from the NSSF, and AMF re-allocation is triggered (step 310). The initial AMF triggers the re-route of the NAS message via RAN using the AMF set as input to the RAN (step 312). The target AMF triggers a new authentication procedure using unprotected NAS, which the UE will not accept (step 314).

As discussed above for case B (see FIG. 1B), the UE will never be able to register in 5GC as the UE will discard any "plain text"/unprotected messages from the Target AMF (e.g. the Authentication Request message). The reason why the target AMF sends this message unprotected is due to the fact that the UE Security context is not available in the Target AMF.

Note that the problems and the solutions described herein are relevant when the UE only provides a SUCI in the initial UE message (i.e., at step 1 in FIG. 1A).

SUMMARY

Systems and methods are disclosed herein for Access and Mobility Function (AMF) re-allocation. In one embodiment, a method for AMF re-allocation comprises, at an initial AMF, receiving a registration request for a User Equipment (UE) from a Radio Access Network (RAN), deciding to initiate an AMF re-allocation procedure by forwarding the registration request to a target AMF for the AMF re-allocation procedure via the RAN, sending the registration request to the RAN for delivery to the target AMF, and sending a UE security context of the UE to another Network Function (NF). The method further comprises, at the other NF, receiving the UE security context of the UE from the initial AMF and providing the UE security context of the UE to the target AMF. The method further comprises, at the target AMF, receiving a message from the RAN wherein the message comprises the registration request from the UE, obtaining the UE security context of the UE from the other NF, and performing protected NAS signaling related to a registration procedure for the UE using the UE security context of the UE. In this manner, the UE can be re-routed to a desired network slice associated to the target AMF without impacting network security or the UE implementation.

In one embodiment, a method performed by an initial AMF for an AMF re-allocation procedure comprises receiving a registration request for a UE from a RAN and deciding to initiate an AMF re-allocation procedure by forwarding the registration request to a target AMF via the RAN. The method further comprises sending the registration request to the RAN for delivery to the target AMF and sending a UE security context of the UE to another NF.

In one embodiment, sending the UE security context of the UE to the other NF comprises storing the UE security context of the UE at the other NF. In one embodiment, storing the UE security context of the UE at the other NF comprises storing, at the other NF, the UE security context of the UE and information that indicates a set of AMFs that can serve one or more network slices requested by the UE. In one embodiment, sending the registration request to the RAN for delivery to the target AMF comprises sending, to the RAN for delivery to the target AMF, the registration request together with the information that indicates the set of AMFs. In another embodiment, storing the UE security context of the UE at the other NF comprises storing, at the other NF, the UE security context of the UE and a token. In one embodiment, sending the registration request to the RAN for delivery to the target AMF comprises sending, to the RAN for delivery to the target AMF, the registration request together with token. In one embodiment, sending the registration request to the RAN for delivery to the target AMF comprises sending, to the RAN for delivery to the target AMF, the registration request together with information that identifies the other NF.

In one embodiment, the method further comprises receiving, from the RAN, a message comprising a pointer to the target AMF in response to sending the registration request to the RAN for delivery to the target AMF. Further, sending the UE security context of the UE to the other NF comprises sending, to the other NF, the UE security context of the UE and the pointer to the target AMF.

In one embodiment, the other NF is an Authentication Server Function (AUSF).

Corresponding embodiments of a network node for implementing an initial AMF for an AMF re-allocation procedure are also disclosed. In one embodiment, the network node is adapted to receive a registration request for a UE from a RAN and decide to initiate an AMF re-allocation procedure by forwarding the registration request to a target AMF via the RAN. The network node is further adapted to send the registration request to the RAN for delivery to the target AMF and send a UE security context of the UE to NF.

In one embodiment, the network node comprises processing circuitry configured to cause the network node to receive the registration request for the UE from the RAN, decide to initiate the AMF re-allocation procedure by forwarding the registration request to the target AMF via the RAN, send the registration request to the RAN for delivery to the target AMF, and send the UE security context of the UE to another other NF.

Embodiments of a method performed by a target AMF for an AMF re-allocation procedure are also disclosed. In one embodiment, the method comprises receiving a message from a RAN, wherein the message comprises a registration request from a UE. The method further comprises obtaining a UE security context of the UE from a NF other than an initial AMF for the AMF re-allocation procedure and performing protected NAS signaling related to a registration procedure for the UE using the UE security context of the UE.

In one embodiment, obtaining the UE security context of the UE from the NF comprises fetching the UE security context of the UE from the NF.

In one embodiment, the message received from the RAN comprises information that identifies the NF, and fetching the UE security context of the UE from the other NF comprises fetching the UE security context of the UE from the NF using the information that identifies the NF.

In one embodiment, the method further comprises obtaining a token from the RAN, and using the token to validate the UE security context of the UE.

In one embodiment, obtaining the UE security context of the UE from the NF comprises receiving the UE security context of the UE from the other NF via a push mechanism.

In one embodiment, the NF is an AUSF.

Corresponding embodiments of a network node for implementing a target AMF for an AMF re-allocation procedure are also disclosed. In one embodiment, a network node for implementing a target AMF for an AMF re-allocation procedure is adapted to receive message from a RAN, wherein the message comprises a registration request from a UE. The network node is further adapted to obtain a UE security context of the UE from a NF other than an initial AMF for the AMF re-allocation procedure and perform protected NAS signaling related to a registration procedure for the UE using the UE security context of the UE.

In one embodiment, the network node comprises processing circuitry configured to cause the network node to receive the message from the RAN, wherein the message comprises the registration request from the UE, obtain the UE security context of the UE from the NF other than the initial AMF for the AMF re-allocation procedure, and perform the protected NAS signaling related to the registration procedure for the UE using the UE security context of the UE.

Embodiments of a method performed by a NF for an AMF re-allocation procedure are also disclosed. In one embodiment, the method comprises receiving a UE security context of a UE from an initial AMF for an AMF re-allocation procedure and providing the UE security context of the UE to a target AMF for the AMF re-allocation procedure.

In one embodiment, the UE security context of the UE is stored by the NF, and providing the UE security context of the UE to the target AMF comprises receiving, from the target AMF, a request for the UE security context and sending the UE security context to the target AMF in response to the request. In one embodiment, receiving the UE security context of the UE from the initial AMF comprises receiving the UE security context together with information that indicates a set of AMFs that can serve one or more network slices requested by the UE.

In another embodiment, receiving the UE security context of the UE from the initial AMF comprises receiving the UE security context together with information that indicates a set of AMFs that can serve one or more network slices requested by the UE and a token. In one embodiment, the request for the UE context comprises a second token, and the method further comprises validating the request based on a comparison of the token and the second token. In one embodiment, sending the UE security context to the target AMF in response to the request comprises sending the UE security context together to the target AMF in response to validating the request.

In one embodiment, receiving the UE security context of the UE from the initial AMF comprises receiving, from the initial AMF, the UE security context of the UE together with a pointer to the target AMF and providing the UE security context of the UE to the target AMF comprises pushing the UE security context of the UE to the target AMF using the pointer to the target AMF.

In one embodiment, the NF is an AUSF.

Corresponding embodiments of a network node for implementing a NF for an AMF re-allocation procedure are also disclosed. In one embodiment, a network node for implementing a NF for an AMF re-allocation procedure is adapted to receive a UE security context of a UE from an initial AMF for an AMF re-allocation procedure and provide the UE security context of the UE to a target AMF (702; 808; 902; 1008) for the AMF re-allocation procedure.

In one embodiment, the network node comprises processing circuitry configured to cause the network node to receive the UE security context of the UE from the initial AMF and provide the UE security context of the UE to the target AMF for the AMF re-allocation procedure.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1A:
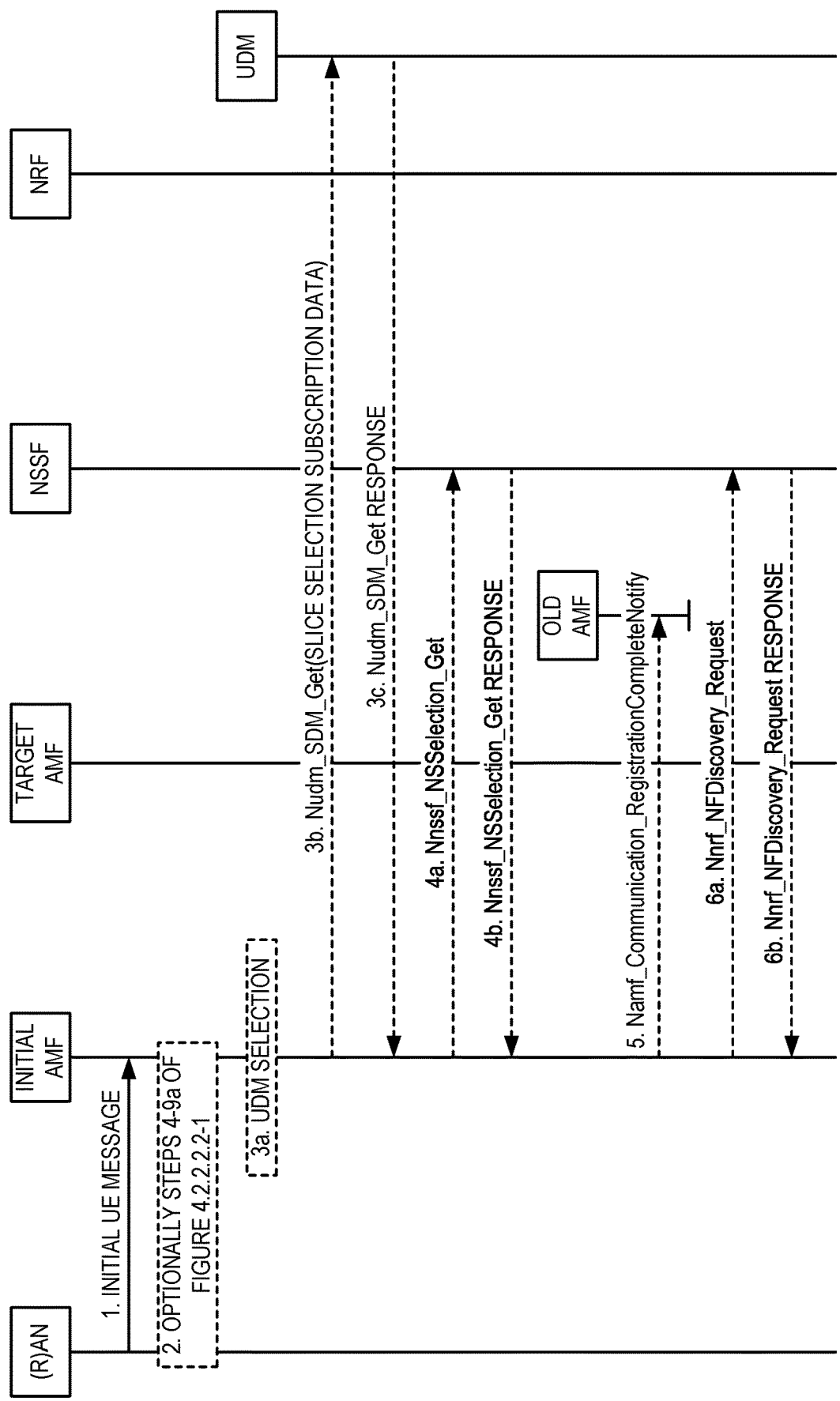
FIGS. 1A and 1B is a reproduction of FIG. 4.2.2.2.3-1 from Third Generation Partnership Project (3GPP) Technical Specification (TS) 23.502 v.15.6.0.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Certain aspects of the present disclosure and their embodiments may provide solutions to the aforementioned or other challenges. Systems and methods are disclosed herein for providing network slice re-allocation with maintained network slice isolation and without UE impact. In some embodiments, this is done by sending the UE Security context over a Service Based Interface (SBI), which is protected by Transport Layer Security (TLS), to the target AMF via an anonymization proxy (e.g. an already existing, mandatory NF in the network common for all network slices).

In order not to impact the UE nor send any security related information through the RAN, embodiments of the solution proposed herein instead send data from the initial AMF to another NF (also referred to herein as a Node Function) that is common for all network slices (e.g. Authentication Server Function (AUSF)). The data can later be retrieved by the target AMF during later execution.

Embodiments disclosed herein make it possible to re-route the UE to the wanted network slice without impacting network security or the UE implementation.

Certain embodiments may provide one or more of the following technical advantage(s). Embodiments disclosed herein make it possible to re-route the UE to the wanted network slice without impacting network security or the UE implementation. Some further example advantages provided by embodiments disclosed herein include:
  upholding the end to end UE security level,
  having no impact on already deployed UE,
  utilizing RAN load balancing functions, and/or
  keeping the network slices isolated (the initial and target AMF do not need to know anything about each other).

Figure 4:
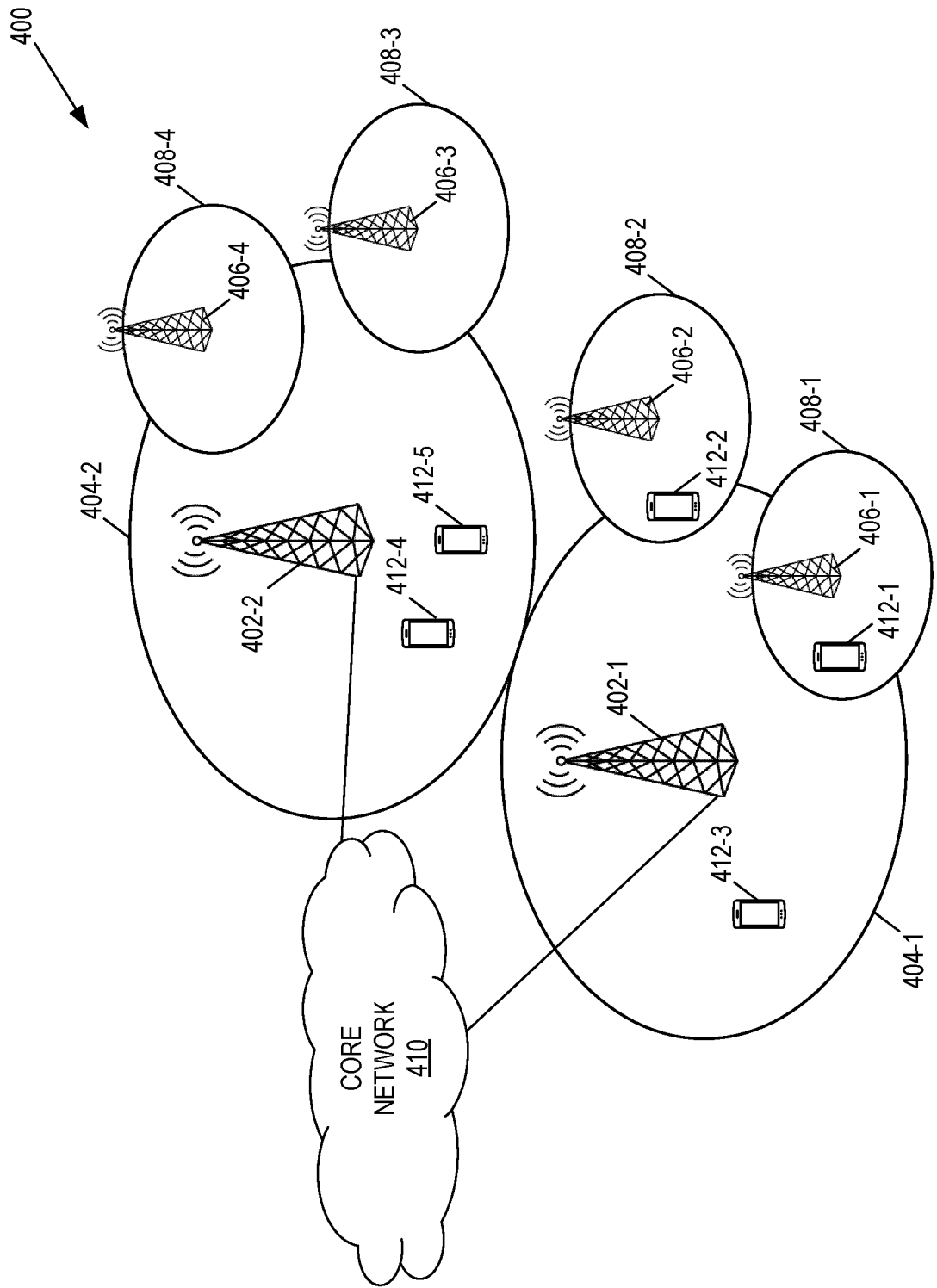
FIG. 4 illustrates one example of a cellular communications system in which embodiments of the present disclosure may be implemented

FIG. 4 illustrates one example of a cellular communications system 400 in which embodiments of the present disclosure may be implemented. In the embodiments described herein, the cellular communications system 400 is a 5G system (5GS) including a NR RAN. However, the embodiments disclosed herein are not limited thereto. In this example, the RAN includes base stations 402-1 and 402-2, which in 5G NR are referred to as gNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G core (5GC). The base stations 402 (and optionally the low power nodes 406) are connected to the core network 410.

The base stations 402 and the low power nodes 406 provide service to wireless devices 412-1 through 412-5 in the corresponding cells 404 and 408. The wireless devices 412-1 through 412-5 are generally referred to herein collectively as wireless devices 412 and individually as wireless device 412. The wireless devices 412 are also sometimes referred to herein as UEs.

Figure 5:
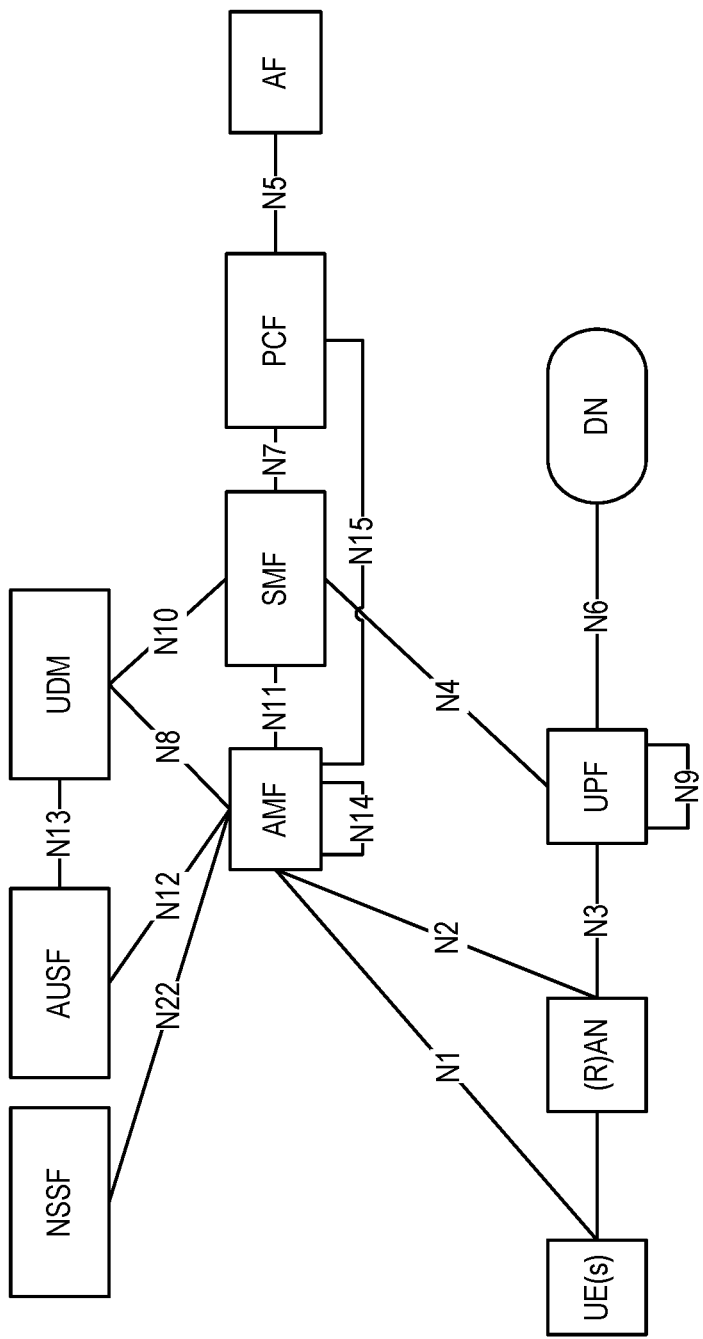
FIGS. 5 and 6 are two representations of an embodiment of the cellular communications system of FIG. 1 in which the cellular communications system is a Fifth Generation System (5GS)

FIG. 5 illustrates a wireless communication system represented as a 5G network architecture composed of core Network Functions (NFs), where interaction between any two NFs is represented by a point-to-point reference point/interface. FIG. 5 can be viewed as one particular implementation of the system 400 of FIG. 4.

Seen from the access side the 5G network architecture shown in FIG. 5 comprises a plurality of User Equipment (UEs) connected to either a Radio Access Network (RAN) or an Access Network (AN) as well as an Access and Mobility Management Function (AMF). Typically, the (R)AN comprises base stations, e.g. such as evolved Node Bs (eNBs) or NR base stations (gNBs) or similar. Seen from the core network side, the 5G core NFs shown in FIG. 5 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 5, the UPF is in the user plane and all other NFs, i.e., the AMF, SMF, PCF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 5. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 6:
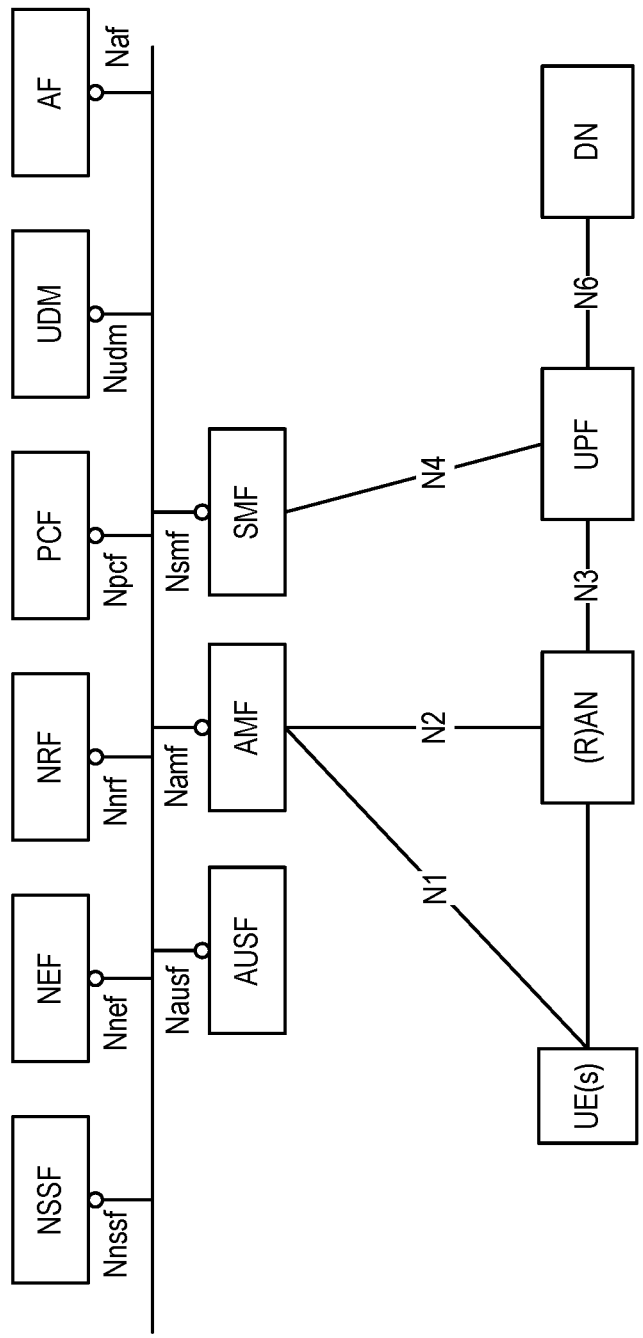

FIG. 6 illustrates a 5G network architecture using service-based interfaces between the NFs in the control plane, instead of the point-to-point reference points/interfaces used in the 5G network architecture of FIG. 5. However, the NFs described above with reference to FIG. 5 correspond to the NFs shown in FIG. 6. The service(s) etc. that a NF provides to other authorized NFs can be exposed to the authorized NFs through the service-based interface. In FIG. 6 the service based interfaces are indicated by the letter "N" followed by the name of the NF, e.g. Namf for the service based interface of the AMF and Nsmf for the service based interface of the SMF etc. The Network Exposure Function (NEF) and the Network Function (NF) Repository Function (NRF) in FIG. 6 are not shown in FIG. 5 discussed above. However, it should be clarified that all NFs depicted in FIG.

5 can interact with the NEF and the NRF of FIG. 6 as necessary, though not explicitly indicated in FIG. 5.

Some properties of the NFs shown in FIGS. 5 and 6 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 1B:
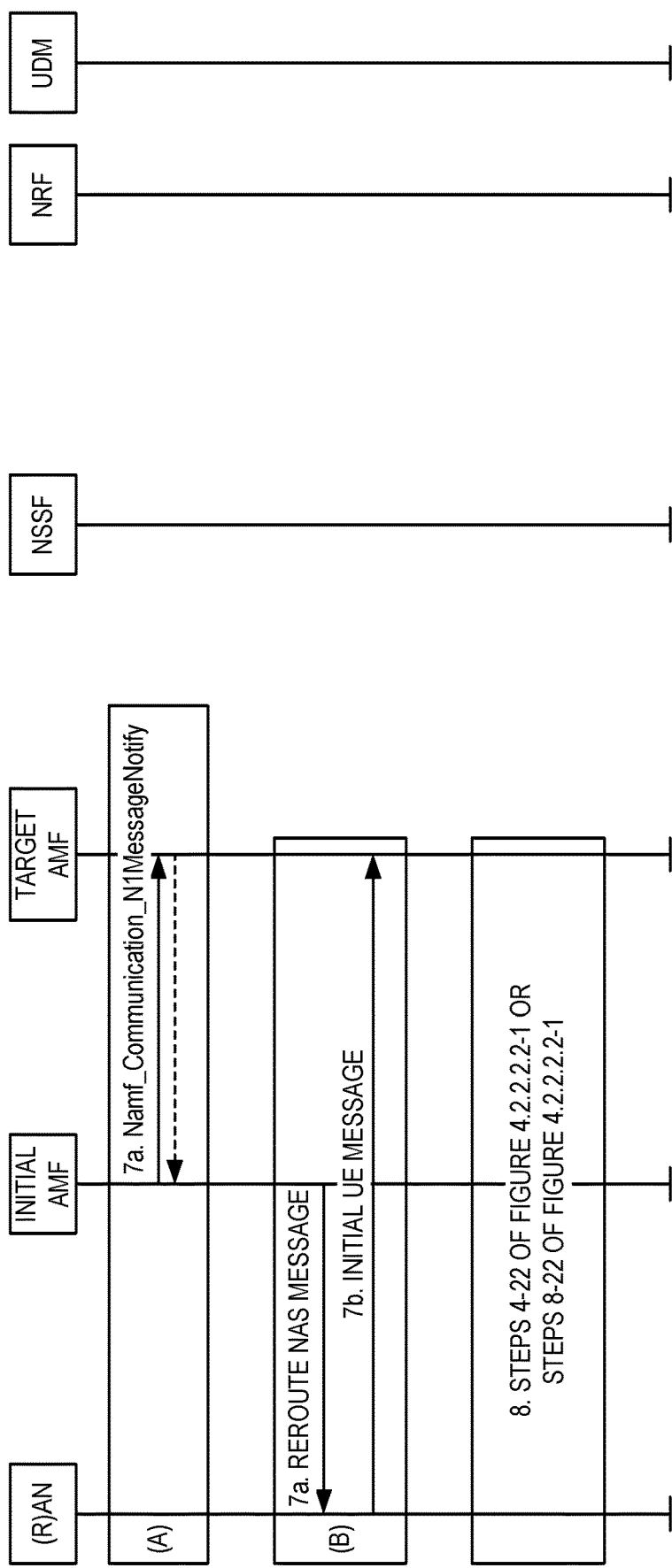
Figure 2:
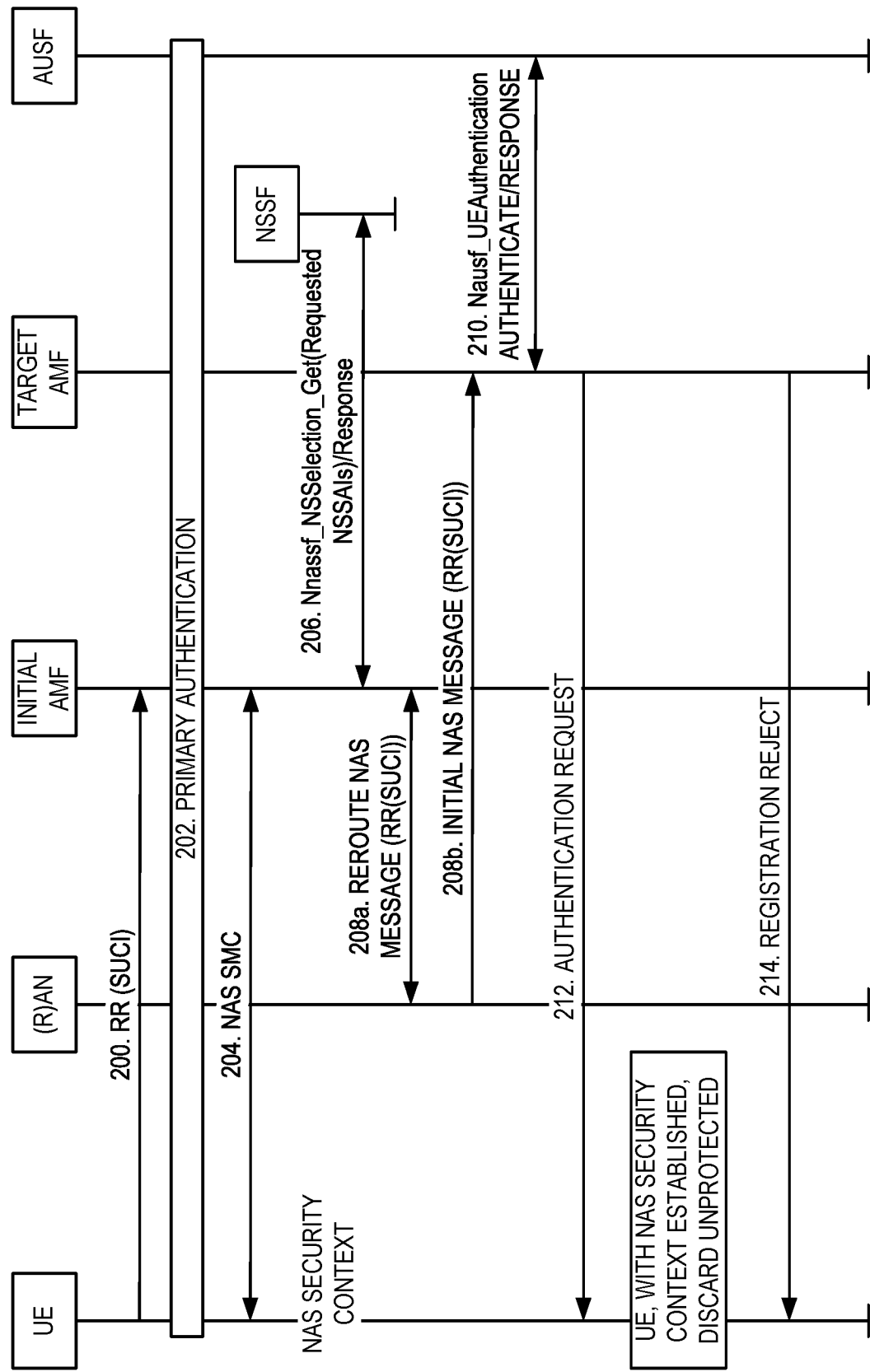
FIG. 2 illustrates a registration failure case 1 in the registration procedure with Access and Mobility Function (AMF) reallocation.
Figure 3:
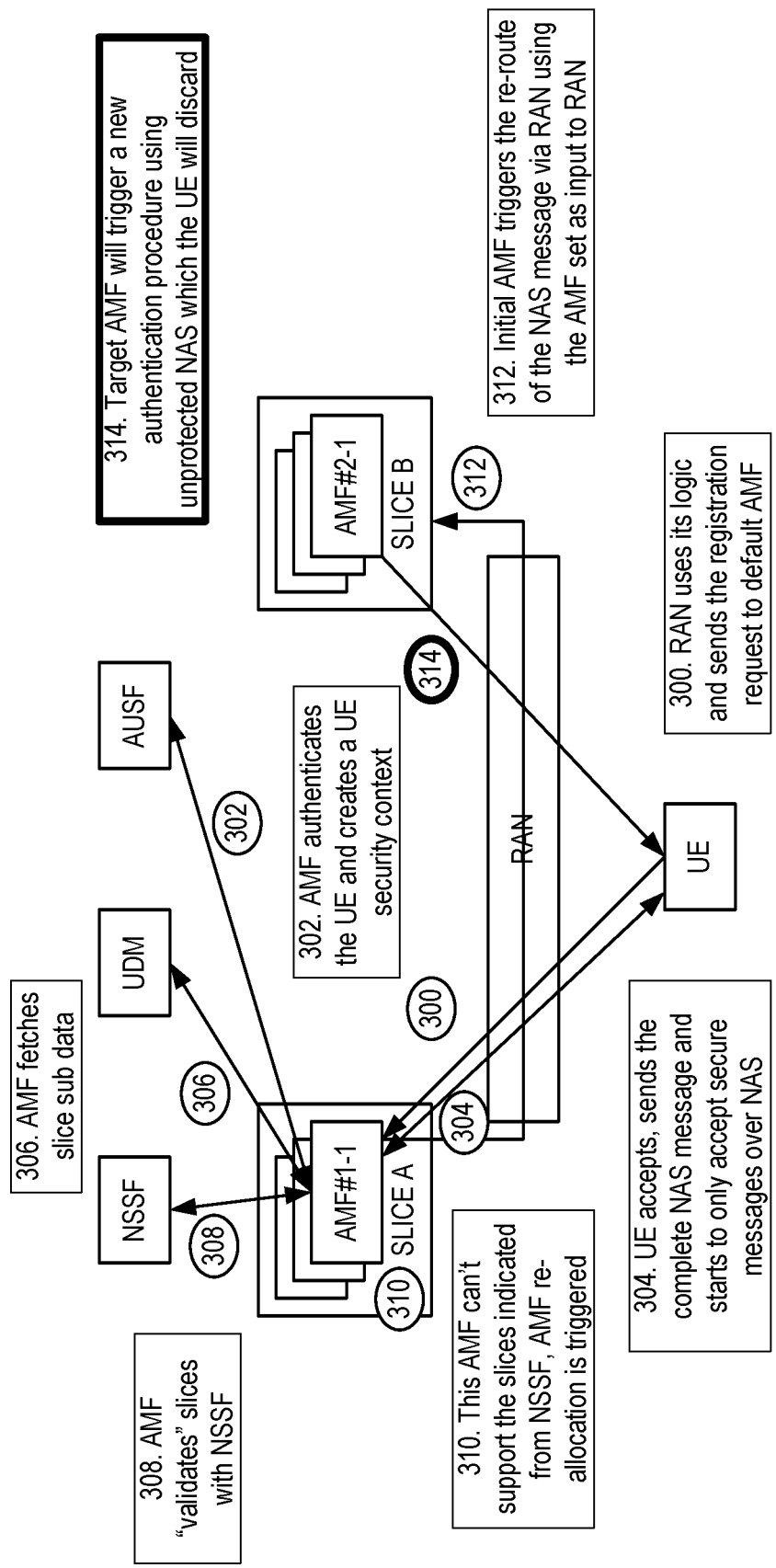
FIG. 3 illustrates the problem of AMF re-allocation using the Radio Access Network (RAN)

Referring to the signaling flow of FIGS. 1A and 1B, in some embodiments:

1. The UE Security Context is stored temporarily in another NF common for all network slices (e.g., AUSF). This may happen, e.g., after step 6b in the process of FIGS. 1A and 1B described above.
2. The NF instance Identifier of the NF holding the UE Security Context (see step 1) is sent together with the re-route NAS message (step (B) 7a in the process of FIGS. 1A and 1B described above) or the "common NF" will be instructed (as part of step 1 above) to push the UE Security Context towards the Target AMF.
3. Using the SUCI as key, the target AMF retrieves the UE Security Context from the NF identified by the NF Instance Identifier received above. This may happen, e.g., after step (B) 7b in the process of FIGS. 1A and 1B described above. As an alternative, the UE Security Context is automatically pushed from the NF (e.g., the AUSF) to the target AMF. This may happen, e.g., after step 1 above.
4. Flow continues as normal as the target AMF then temporarily can protect the NAS messages using the UE security context created by initial AMF, until a new UE security context is created by the Target AMF.
5. In some embodiments, in order to improve security, the initial AMF generates a token together with the UE Security Context. The token is provided to target AMF via RAN and verified by the NF (or target AMF) when UE Security Context is delivered/received.

Figure 7:
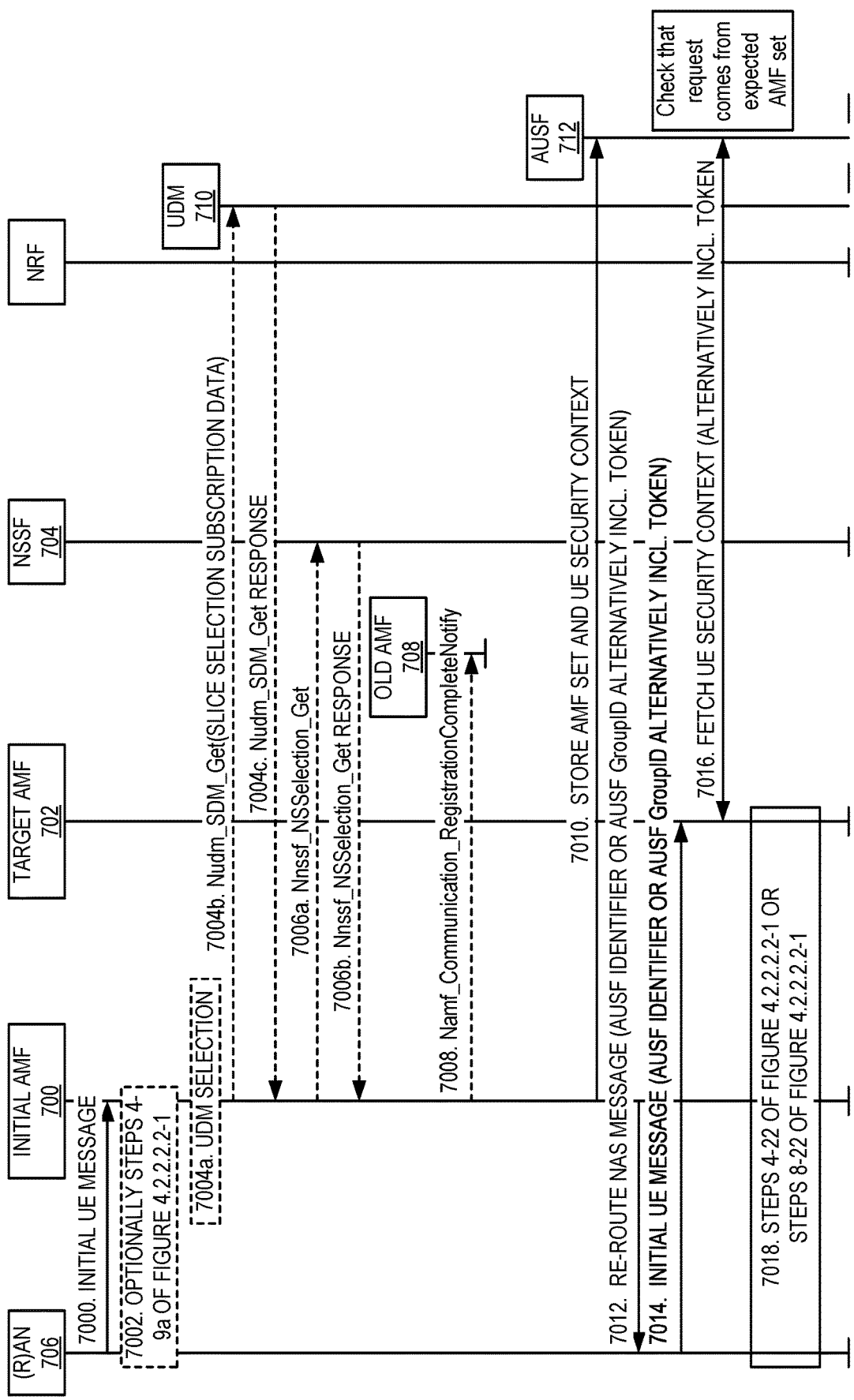
FIGS. 7 and 8 illustrate an AMF reallocation procedure using an anonymous proxy in accordance with a first embodiment of the present disclosure.

FIG. 7 illustrates an AMF reallocation procedure using an anonymous proxy in accordance with a first embodiment of the present disclosure. This procedure is a version of the procedure illustrated in FIGS. 1A and 1B that is modified in accordance with the first embodiment of the present disclosure in which an anonymous proxy is used to enable the Target AMF to retrieve the UE Security context during AMF reallocation.

When an AMF 700 (also referred to herein as the "initial AMF" 700) receives a Registration Request for a UE, the AMF 700 may need to reroute the Registration Request to another AMF, e.g. when the initial AMF 700 is not the appropriate AMF to serve the UE. The registration with AMF re-allocation procedure of FIG. 7 is used to reroute the NAS message of the UE to a target AMF 702 during a registration procedure.

The initial AMF 700 and the target AMF 702 register their network slice capability at NSSF 704.

Step 7000: At this point, RAN 706 has received a registration request from the UE (e.g., UE 412) and performed AMF selection to select the initial AMF 700 (see, e.g., steps 1 and 2 of FIG. 4.2.2.2.2-1 of 3GPP TS 23.502 (e.g., V15.6.0)). As such, the (R)AN 706 sends the Registration request message within an initial UE message to the initial AMF 700.

Step 7002: [Conditional] If the initial AMF 700 needs the SUPI and/or the UE's subscription information to decide whether to reroute the Registration Request or if the Registration Request was not sent integrity protected or integrity protection is indicated as failed, then the initial AMF 700 performs steps 4 to 9 of FIG. 4.2.2.2.2-1 of 3GPP TS 23.502 (e.g., V15.6.0).

Step 7004a: [Conditional] If the initial AMF 700 needs UE's subscription information to decide whether to reroute the Registration Request and UE's slice selection subscription information was not provided by old AMF 708, the AMF 700 selects a UDM 710 as described in 3GPP TS 23.501, clause 6.3.8.

Step 7004b: Initial AMF 700 to UDM 710: Nudm_SDM_Get (SUPI, Slice Selection Subscription data).

The initial AMF 700 request UE's Slice Selection Subscription data from the UDM 710 by invoking the Nudm_SDM_Get (see clause 5.2.3.3.1 of 3GPP TS 23.502, e.g., (V15.6.0)) service operation. The UDM 710 may get this information from UDR (not shown) by Nudr_DM_Query (SUPI, Subscribed S-NSSAIs).

Step 7004c: UDM 710 to initial AMF 700: Response to Nudm_SDM_Get. UDM 710 responds with slice selection data to initial AMF 700. More specifically, the AMF 700 gets, from the UDM 710, the Slice Selection Subscription data including Subscribed Single Network Slice Selection Assistance Informations (S-NSSAIs). The UDM 710 may provide indication that the subscription data for network slicing is updated for the UE.

Step 7006a: [Conditional] Initial AMF 700 to NSSF 704: Nnssf_NSSelection_Get (Requested NSSAI, [Mapping Of Requested NSSAI], Subscribed S-NSSAI(s) with the default S-NSSAI indication, TAI, Allowed NSSAI for the other access type (if any), [Mapping of Allowed NSSAI], PLMN ID of the SUPI).

If there is a need for slice selection, (see clause 5.15.5.2.1 of TS 23.501), e.g. if the initial AMF 700 cannot serve all the S-NSSAI(s) from the Requested NSSAI permitted by the subscription information, the initial AMF 700 invokes the Nnssf_NSSelection_Get service operation from the NSSF 704 by including Requested NSSAI, optionally Mapping Of Requested NSSAI, Subscribed S-NSSAIs with the default S-NSSAI indication, Allowed NSSAI for the other access type (if any), Mapping of Allowed NSSAI, PLMN ID of the SUPI, and the TAI of the UE.

Step 7006b: [Conditional] NSSF 704 to Initial AMF 700: Response to Nnssf_NSSelection_Get (AMF Set or list of AMF addresses, Allowed NSSAI for the first access type, [Mapping Of Allowed NSSAI], [Allowed NSSAI for the second access type], [Mapping of Allowed NSSAI], [NSI ID(s)], [NRF(s)], [List of rejected (S-NSSAI(s), cause value(s))], [Configured NSSAI for the Serving PLMN], [Mapping Of Configured NSSAI]).

The NSSF 704 performs the steps specified in point (B) in clause 5.15.5.2.1 of TS 23.501. The NSSF 704 returns to the initial AMF 700 the Allowed NSSAI for the first access type, optionally the Mapping Of Allowed NSSAI, the Allowed NSSAI for the second access type (if any), optionally the Mapping of Allowed NSSAI and the target AMF Set or, based on configuration, the list of candidate AMF(s). The NSSF 704 may return NSI ID(s) associated to the Network Slice instance(s) corresponding to certain S-NSSAI(s). The NSSF 704 may return the NRF(s) to be used to select NFs/services within the selected Network Slice instance(s). It may return also information regarding rejection causes for S-NSSAI(s) not included in the Allowed NSSAI. The NSSF 704 may return Configured NSSAI for the Serving PLMN, and possibly the associated mapping of the Configured NSSAI.

NOTE: The NRF(s) returned by the NSSF 704, if any, belong to any level of NRF (see clause 6.2.6 of TS 23.501) according to the deployment decision of the operator.

Step 7008: [Conditional] Initial AMF 700 to old AMF 708: Namf_Communication_RegistrationCompleteNotify (failure cause).

The initial AMF 700 decides to reroute the NAS message to another AMF. The initial AMF 700 sends a reject indication to the old AMF 708 telling the old AMF 708 that the UE Registration procedure did not fully complete at the initial AMF 700. The old AMF 708 continues as if the Namf_Communication_UEContextTransfer had never been received.

Steps 7010-7014: The initial AMF 700, based on local policy and subscription information, decides to forward the NAS message to the target AMF 702 via (R)AN. The initial AMF 700 stores the AMF set, UE Security Context and optionally a token in AUSF 712 (step 7010) and sends a Reroute NAS message to the (R)AN (step 7012). The Reroute NAS message includes the information about the target AMF Set, the full Registration Request message, and optionally a token. If the initial AMF 700 has obtained Allowed NSSAI as described at step 4b, that information is included. The NF instance Identifier (of the NF holding the UE Security Context, see step 7010) is sent together with the Re-route NAS message in step 7012. The (R)AN sends the Initial UE message to the target AMF 702 (step 7014) indicating reroute due to slicing, where the Initial UE message includes the NF instance Identifier and, if provided in the Reroute NAS message, also the Allowed NSSAI and token.

Steps 7016 and 7018: After receiving the Initial UE message including the Registration Request message, the target AMF fetches the UE Security Context of the UE from the AUSF 712 (step 7016). More specifically, using the SUCI as key, the target AMF 702 retrieves the UE Security Context from the AUSF 712 identified by the NF Instance Identifier received above. In some embodiments, in order to improve security, the initial AMF 700 generates a token together with the UE Security Context. The token is provided to the target AMF 702 via RAN (e.g., in steps 7012 and 7014) and verified by the AUSF 712 (or target AMF 702) when the UE Security Context is fetched. In other words, the request from the target AMF 702 to retrieve the UE Security Context from the AUSF 712 includes a token, where the AUSF 712 validates the request based on a comparison of the token included in the request and the token stored at the AUSF 712 by the initial AMF 700 in association with the UE Security Context. Further, based on rerouting due to slicing, the target AMF 702 continues with the Registration procedure from step 4 until 22 of FIG. 4.2.2.2.2-1 of TS 23.502 (e.g., V15.6.0) (with the target AMF 702 corresponding to the new AMF) (step 7018).

Figure 8:
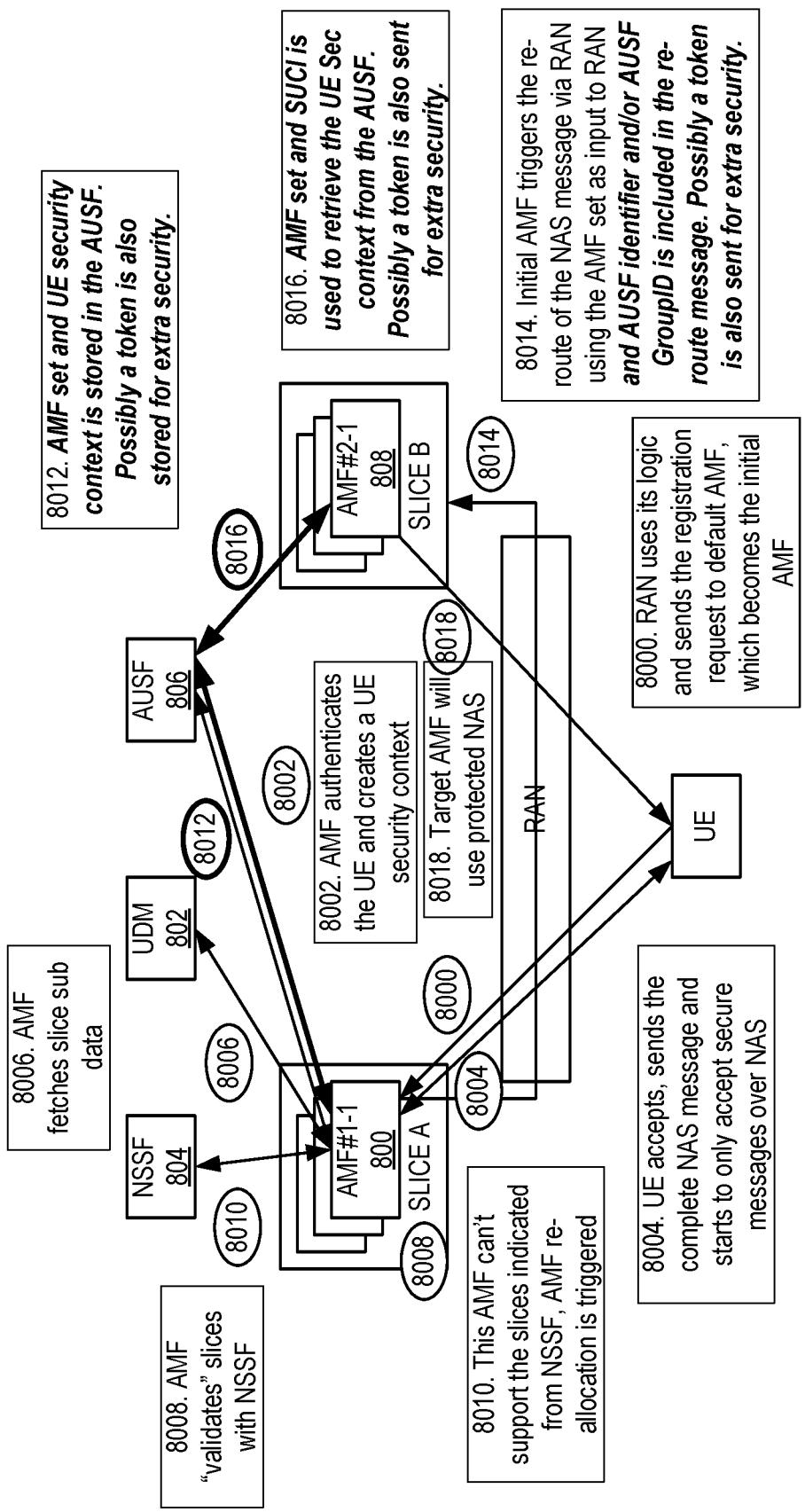

FIG. 8 illustrates an AMF reallocation procedure using an anonymous proxy in accordance with the first embodiment of the present disclosure. The steps of the procedure are as follows:

Step 8000: The RAN (e.g., a base station 402) sends a registration request (from the UE) to a default AMF 800. This default AMF 800 is the initial AMF for the AMF reallocation and, as such, is also referred to as initial AMF 800. In FIG. 8, the initial AMF 800 is also denoted as AMF #1-1 and is part of network slice A.

Step 8002: The initial AMF 800 authenticates the UE and creates a UE security context for the UE.

Step 8004: The UE accepts the Security Mode Command message, sends the Security Mode Complete message including the complete NAS message, and starts to only accept secure messages over NAS.

Step 8006: The initial AMF 800 fetches Network Slice data for the UE from UDM 802. As discussed above, this Network Slice data may be the UE's Slice Selection Subscription data, which includes Subscribed S-NSSAIs.

Step 8008: The initial AMF 800 validates the Network Slice(s) (i.e., the Network Slice(s) corresponding to the subscribed S-NSSAIs) in the Requested NSSAI and concludes that it cannot serve all the S-NSSAI(s) from the Requested NSSAI permitted by the subscription information. The initial AMF 800 invokes assistance from NSSF 804.

Step 8010: The NSSF 804 determines that the initial AMF 800 cannot support the Network Slices indicated to the NSSF 804 and, therefore, provides a target AMF Set ID (directly or indirectly) to the initial AMF 800, which triggers AMF re-allocation.

Step 8012: The initial AMF 800 stores the target AMF set (e.g., the AMF set obtained from the NSSF 804 that includes AMFs that can serve all of the Subscribed S-NSSAIs) and the UE security context in AUSF 806. In some embodiments, a token is also stored for additional security.

Step 8014: The initial AMF 800 (i.e., the initial AMF for the AMF re-allocation) triggers the re-route of the NAS message including the registration request via the RAN using the AMF set as input to the RAN. The AUSF identifier of the AUSF 806 in which the AMF set and UE security context was stored in step 8012 is also include in the re-route message. In some embodiments, the token is also included for additional security.

Step 8016: The AMF set and SUCI is used by target AMF 808 to retrieve the UE security context from the AUSF 806. As illustrated, in this example, the target AMF 808, which is also denoted as AMF #2-1, is part of network slice B. In some embodiments, the token is also used for verification when the UE security context is fetched from the AUSF 806.

Step 8018: The target AMF 808 continues the process using protected NAS signaling (e.g., based on the retrieved UE security context).

Figure 9:
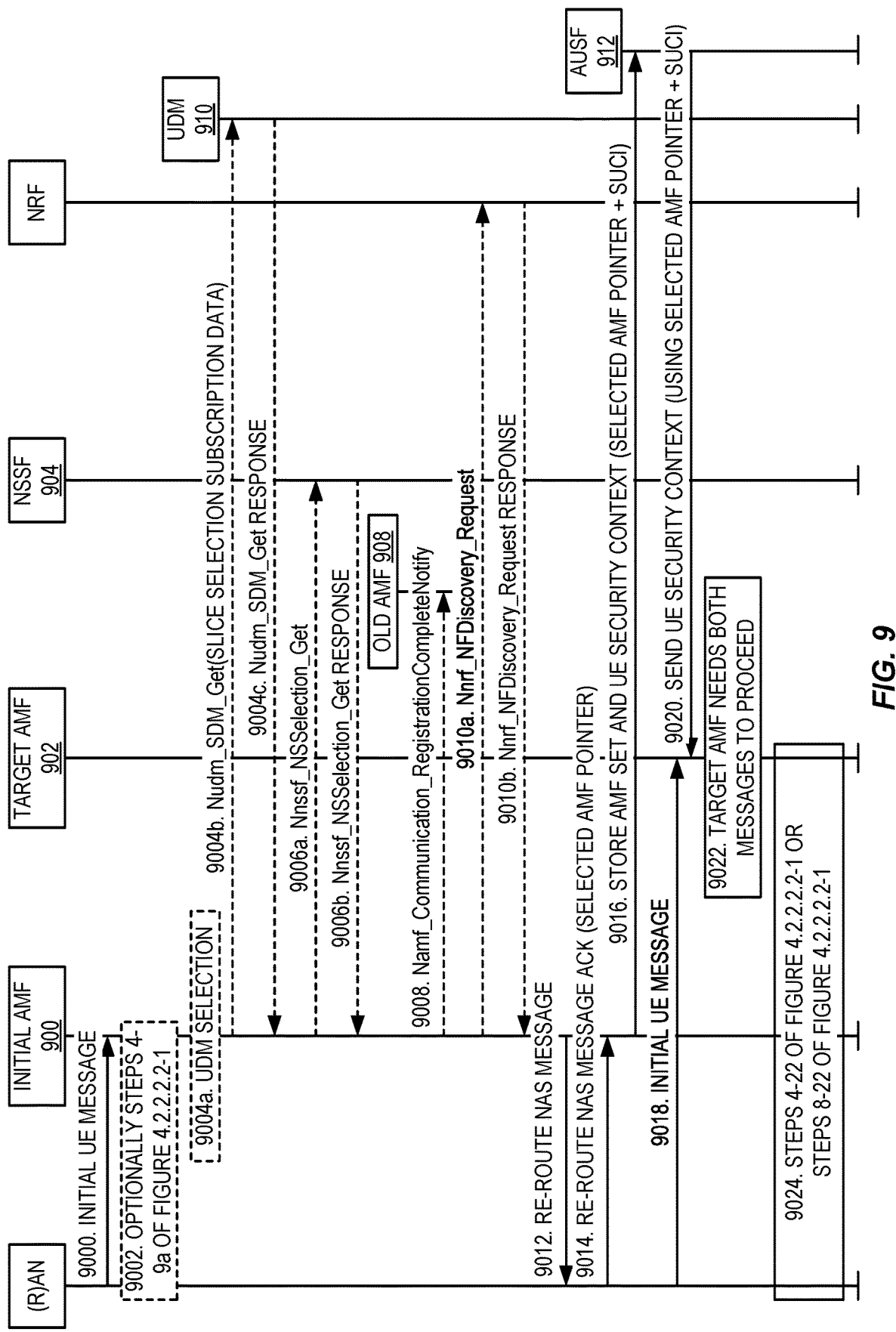
FIGS. 9 and 10 illustrate an AMF reallocation procedure using an anonymous proxy in accordance with a second embodiment of the present disclosure.

FIG. 9 illustrates an AMF reallocation procedure using an anonymous proxy in accordance with a second embodiment of the present disclosure. This procedure is a version of the procedure illustrated in FIGS. 1A and 1B that is modified in accordance with the second embodiment of the present disclosure in which an anonymous proxy is used to enable the target AMF to retrieve the UE Security context during AMF reallocation.

When an AMF 900 (also referred to herein as the "initial AMF" 900) receives a Registration Request for a UE, the AMF 900 may need to reroute the Registration Request to another AMF, e.g. when the initial AMF 900 is not the appropriate AMF to serve the UE. The registration with AMF re-allocation procedure of FIG. 9 is used to reroute the NAS message of the UE to a target AMF 902 during a registration procedure.

The initial AMF 900 and the target AMF 902 register their Network Slice capability at NSSF 904.

- Step 9000: At this point, the RAN has received a registration request from the UE and performed AMF selection to select the initial AMF 900 (see, e.g., steps 1 and 2 of FIG. 4.2.2.2.2-1 of 3GPP TS 23.502, e.g., (V15.6.0)). As such, the (R)AN sends the Registration Request message within an Initial UE message to the initial AMF 900.
- Step 9002: [Conditional] If the initial AMF 900 needs the SUPI and/or the UE's subscription information to decide whether to reroute the Registration Request or if the Registration Request was not sent integrity protected or integrity protection is indicated as failed, then the initial AMF 900 performs steps 4 to 9 of FIG. 4.2.2.2.2-1 of 3GPP TS 23.502 (e.g., V15.6.0).
- Step 9004*a*: [Conditional] If the initial AMF 900 needs UE's subscription information to decide whether to reroute the Registration Request and UE's slice selection subscription information was not provided by old AMF 908, the AMF 900 selects a UDM 910 as described in 3GPP TS 23.501, clause 6.3.8.
- Step 9004*b*: Initial AMF 900 to UDM 910: Nudm_SDM_Get (SUPI, Slice Selection Subscription data).

The initial AMF 900 request UE's Slice Selection Subscription data from the UDM 910 by invoking the Nudm_SDM_Get (see clause 5.2.3.3.1 of 3GPP TS 23.502, e.g., (V15.6.0)) service operation. The UDM 910 may get this information from UDR (not shown) by Nudr_DM_Query (SUPI, Subscribed S-NSSAIs).
- Step 9004*c*: UDM 910 to initial AMF 900: Response to Nudm_SDM_Get. The UDM 910 responds with slice selection data to initial AMF. More specifically, the AMF 900 gets the Slice Selection Subscription data including Subscribed S-NSSAIs. The UDM 910 may provide indication that the subscription data for networking slicing is updated for the UE.
- Step 9006*a*: [Conditional] Initial AMF 900 to NSSF 904: Nnssf_NSSelection_Get (Requested NSSAI, [Mapping Of Requested NSSAI], Subscribed S-NSSAI(s) with the default S-NSSAI indication, TAI, Allowed NSSAI for the other access type (if any), [Mapping of Allowed NSSAI], PLMN ID of the SUPI).

If there is a need for slice selection, (see clause 5.15.5.2.1 of TS 23.501), e.g. the initial AMF 900 cannot serve all the S-NSSAI(s) from the Requested NSSAI permitted by the subscription information, the initial AMF 900 invokes the Nnssf_NSSelection_Get service operation from the NSSF 904 by including Requested NSSAI, optionally Mapping Of Requested NSSAI, Subscribed S-NSSAIs with the default S-NSSAI indication, Allowed NSSAI for the other access type (if any), Mapping of Allowed NSSAI, PLMN ID of the SUPI and the TAI of the UE.
- Step 9006*b*: [Conditional] NSSF 904 to Initial AMF 900: Response to Nnssf_NSSelection_Get (AMF Set or list of AMF addresses, Allowed NSSAI for the first access type, [Mapping Of Allowed NSSAI], [Allowed NSSAI for the second access type], [Mapping of Allowed NSSAI], [NSI ID(s)], [NRF(s)], [List of rejected (S-NSSAI(s), cause value(s))], [Configured NSSAI for the Serving PLMN], [Mapping Of Configured NSSAI]).

The NSSF 904 performs the steps specified in point (B) in clause 5.15.5.2.1 of TS 23.501. The NSSF 904 returns to the initial AMF 900 the Allowed NSSAI for the first access type, optionally the Mapping Of Allowed NSSAI, the Allowed NSSAI for the second access type (if any), optionally the Mapping of Allowed NSSAI and the target AMF Set or, based on configuration, the list of candidate AMF(s). The NSSF 904 may return NSI ID(s) associated to the Network Slice instance(s) corresponding to certain S-NSSAI(s). The NSSF 904 may return the NRF(s) to be used to select NFs/services within the selected Network Slice instance(s). It may return also information regarding rejection causes for S-NSSAI(s) not included in the Allowed NSSAI. The NSSF 904 may return Configured NSSAI for the Serving PLMN, and possibly the associated mapping of the Configured NSSAI.
- NOTE: The NRF(s) returned by the NSSF 904, if any, belong to any level of NRF (see clause 6.2.6 of TS 23.501) according to the deployment decision of the operator.
- Step 9008: [Conditional] Initial AMF 900 to old AMF 908: Namf_Communication_RegistrationCompleteNotify (failure cause).

The initial AMF 900 decides to reroute the NAS message to another AMF. The initial AMF 900 sends a reject indication to the old AMF 908 telling that the UE Registration procedure did not fully complete at the initial AMF 900. The old AMF 908 continues as if the Namf_Communication_UEContextTransfer had never been received.
- Steps 9010*a*-9010*b*: [Conditional] The initial AMF 900 sends a discovery request to the NRF, and receives a discovery request response from the NRF.
- Steps 9012-9018: The initial AMF 900, based on local policy and subscription information, decides to forward the NAS message to the target AMF 902 via (R)AN. The initial AMF 900 sends a Reroute NAS message to the (R)AN (step 9012). The Reroute NAS message includes the information about the target AMF Set, the full Registration Request message, and optionally a token. If the initial AMF 900 has obtained Allowed NSSAI as described at step 9006*b*, that information is included. The (R)AN returns, to the initial AMF 900, a re-route NAS message ACK including a selected AMF pointer (step 9014). The initial AMF 900 sends the UE security context together with the selected AMF pointer and SUCI to an AUSF 912 (step 9016). The (R)AN sends the Initial UE message to the target AMF 902 (step 9018) indicating reroute due to slicing including, if provided in the Reroute NAS message, also the Allowed NSSAI and token.
- Step 9020: The AUSF 912 pushes the UE security context to the target AMF 902 using the selected AMF pointer and SUCI. In some embodiments, in order to improve security, the initial AMF 900 generates a token that is sent to the AUSF 912 together with the UE security context. The token is also provided to the target AMF 902 via RAN (e.g., in steps 9012 and 9018) and verified by the target AMF 902 when UE context (and token) is received from the AUSF 912.

Steps 9022 and 9024: After receiving the Initial UE message including the Registration Request message from the (R)AN and the UE security context from the AUSF 912, based on rerouting due to slicing, the target AMF 902 continues with the Registration procedure from step 4 until 22 of FIG. 4.2.2.2.2-1 of TS 23.502 (e.g., V15.6.0) (with the target AMF 902 corresponding to the new AMF).

Figure 10:
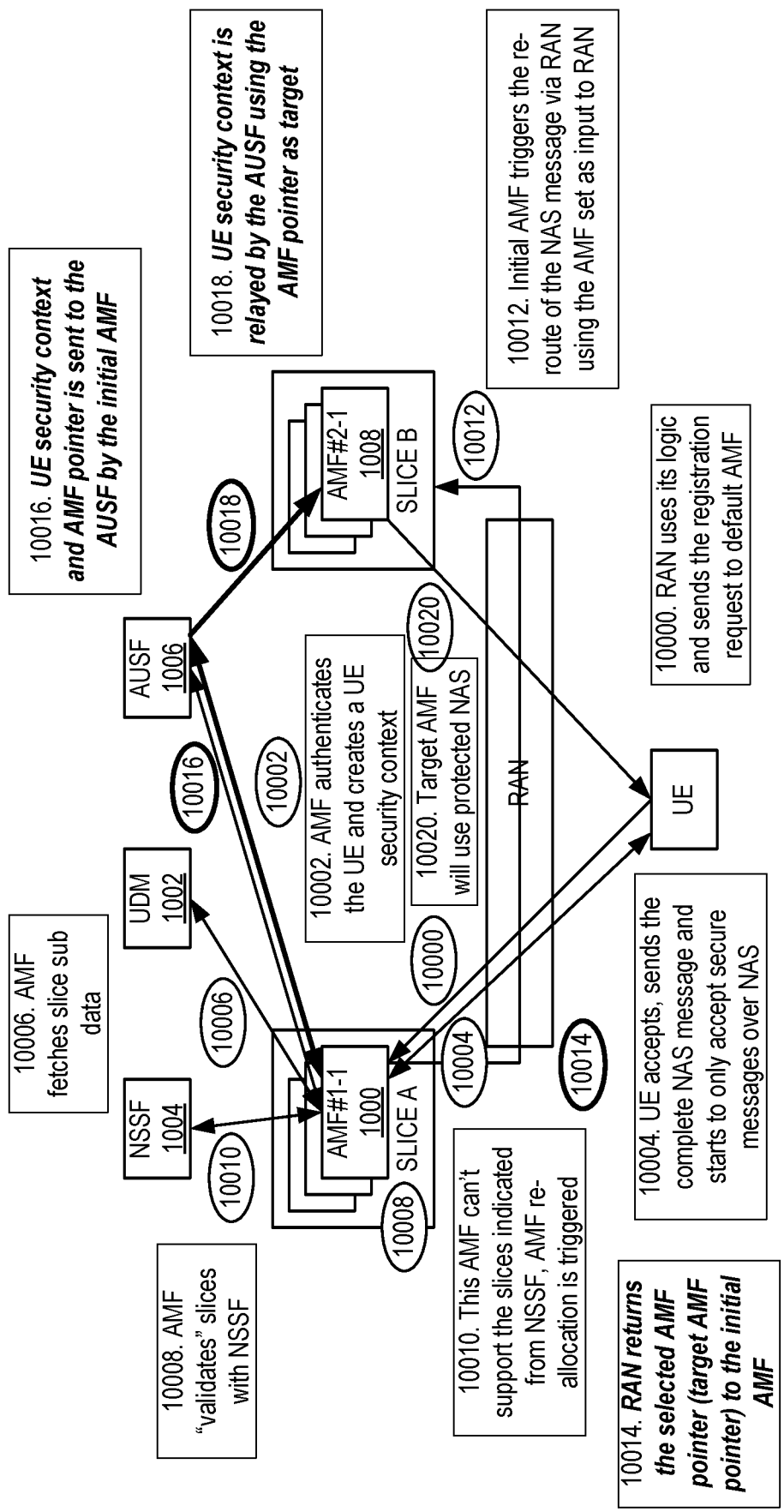

FIG. 10 illustrates an AMF reallocation procedure using an anonymous proxy in accordance with the second embodiment of the present disclosure. The steps of the procedure are as follows:

Step 10000: The RAN (e.g., a base station 402) sends a registration request (from the UE) to a default AMF 1000. This default AMF 1000 is the initial AMF for the AMF reallocation and, as such, is also referred to as initial AMF 1000. In FIG. 10, the initial AMF 1000 is also denoted as AMF #1-1 and is part of network slice A.

Step 10002: The initial AMF 1000 authenticates the UE and creates a UE security context for the UE.

Step 10004: The UE accepts the Security Mode Command message, sends the Security Mode Complete message including the complete NAS message, and starts to only accept secure messages over NAS.

Step 10006: The initial AMF 1000 fetches Network Slice data for the UE from UDM 1002. As discussed above, this Network Slice data may be the UE's Slice Selection Subscription data, which includes Subscribed S-NSSAIs.

Step 10008: The initial AMF 1000 validates the Network Slice(s) (i.e., the Network Slice(s) corresponding to the subscribed S-NSSAIs) in the Requested NSSAI and concludes that it cannot serve all the S-NSSAI(s) from the Requested NSSAI permitted by the subscription information. Initial AMF invokes assistance from NSSF 1004.

Step 10010: The NSSF 1004 determines that the initial AMF 1000 cannot support the Network Slices indicated to the NSSF 1004 and, therefore, provides a target AMF Set ID (directly or indirectly) to the initial AMF 1000, which triggers AMF re-allocation.

Step 10012: The initial AMF 1000 (i.e., the initial AMF for the AMF re-allocation) triggers the re-route of the NAS message including the registration request via the RAN using the AMF set as input to the RAN. In some embodiments, a token is also included for additional security.

Step 10014: The RAN returns the selected AMF pointer (target AMF pointer) to the initial AMF 1000.

Step 10016: The initial AMF 1000 sends the UE security context and the target AMF pointer to AUSF 1006. In some embodiments, a token is also stored for additional security.

Step 10018: The AUSF 1006 relays the UE security context (and optionally the token) to target AMF 1008 using the target AMF pointer.

Step 10020: The target AMF 1008 continues the process using protected NAS signaling (e.g., based on the received UE security context).

Figure 11:
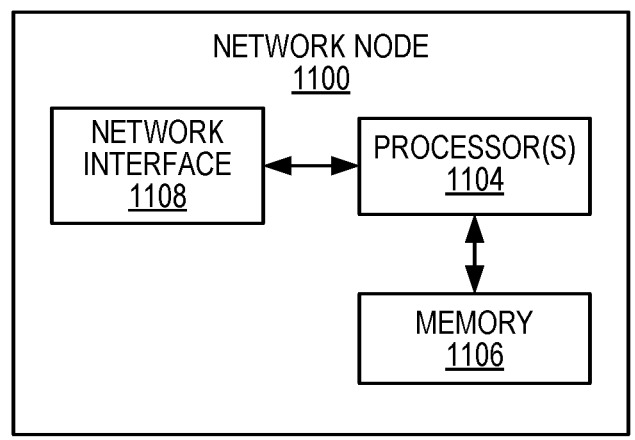
FIGS. 11 through 13 are schematic block diagrams of example embodiments of a network node in which aspects of the embodiments of the present disclosure may be implemented.

FIG. 11 is a schematic block diagram of a network node 1100 according to some embodiments of the present disclosure. The network node 1100 may be, for example, a core network node that implements an initial AMF or a target AMF for a AMF re-allocation in accordance with any of the embodiments described above, or a core network node that implements the NF (e.g., AUSF) that stores or relays the UE security context information during an AMF re-allocation in accordance with any of the embodiments described above. As illustrated, the network node 1100 includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. The one or more processors 1104 operate to provide one or more functions of a network node 1100 as described herein (e.g., one or more functions of an initial AMF, a target AMF, or a AUSF as described herein, e.g., with respect to FIGS. 7, 8, 9, and/or 10). In some embodiments, the function(s) are implemented in software that is stored, e.g., in the memory 1106 and executed by the one or more processors 1104.

Figure 12:
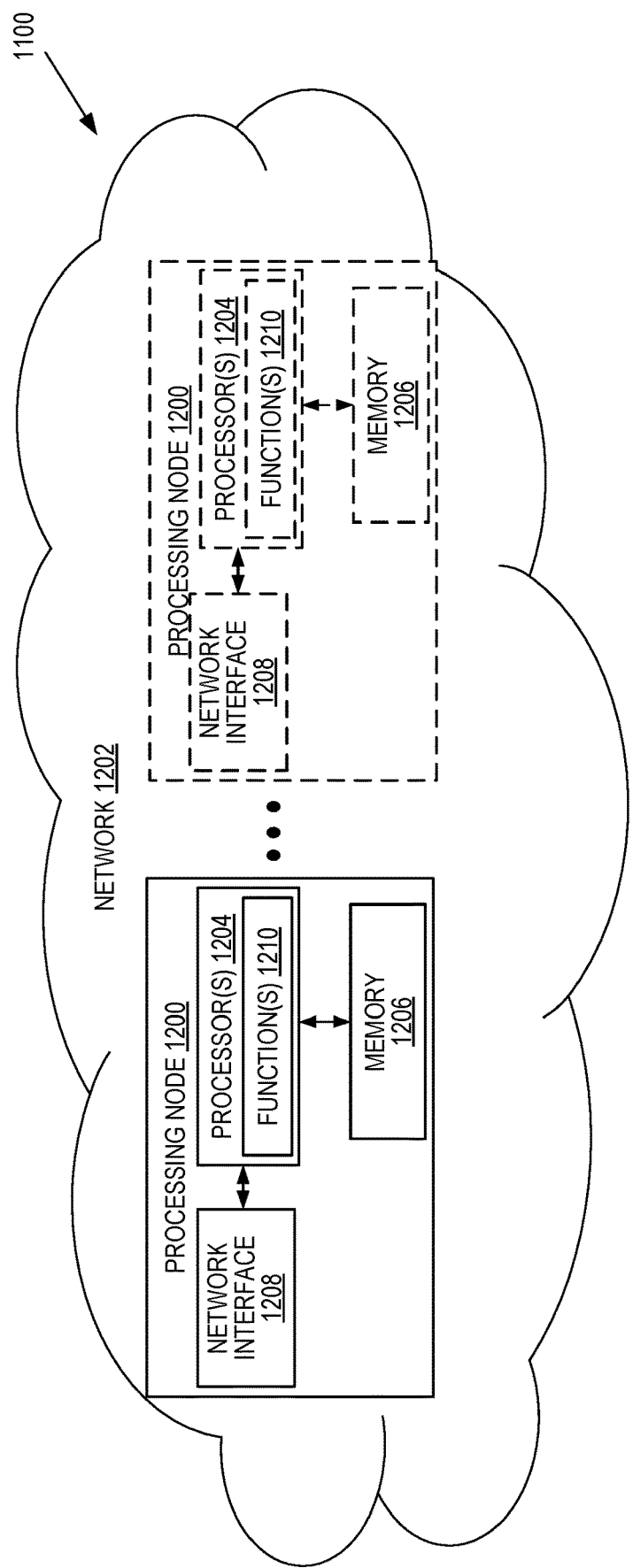

FIG. 12 is a schematic block diagram that illustrates a virtualized embodiment of the network node 1100 according to some embodiments of the present disclosure. As used herein, a "virtualized" network node is an implementation of the network node 1100 in which at least a portion of the functionality of the network node 1100 is implemented as a virtual component(s) (e.g., via a virtual machine(s) executing on a physical processing node(s) in a network(s)). As illustrated, in this example, the network node 1100 includes one or more processing nodes 1200 coupled to or included as part of a network(s) 1202. Each processing node 1200 includes one or more processors 1204 (e.g., CPUs, ASICs, FPGAs, and/or the like), memory 1206, and a network interface 1208.

In this example, functions 1210 of the network node 1100 described herein (e.g., one or more functions of an initial AMF, a target AMF, or a AUSF as described herein, e.g., with respect to FIGS. 7, 8, 9, and/or 10) are implemented at the one or more processing nodes 1200 or distributed across the two or more processing nodes 1200 in any desired manner. In some particular embodiments, some or all of the functions 1210 of the network node 1100 described herein (e.g., one or more functions of an initial AMF, a target AMF, or a AUSF as described herein, e.g., with respect to FIGS. 7, 8, 9, and/or 10) are implemented as virtual components executed by one or more virtual machines implemented in a virtual environment(s) hosted by the processing node(s) 1200.

In some embodiments, a computer program including instructions which, when executed by at least one processor, causes the at least one processor to carry out the functionality of the network node 1100 or a node (e.g., a processing node 1200) implementing one or more of the functions 1210 of the network node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
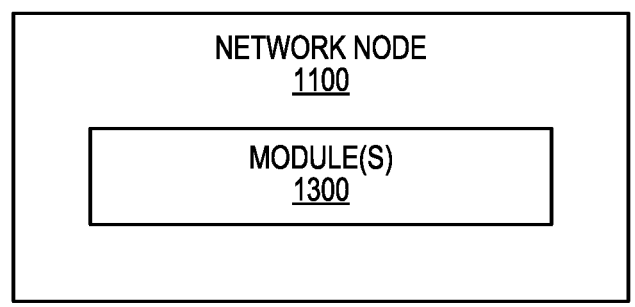

FIG. 13 is a schematic block diagram of the network node 1100 according to some other embodiments of the present disclosure. The network node 1100 includes one or more modules 1300, each of which is implemented in software.

The module(s) 1300 provide the functionality of the network node 1100 described herein (e.g., one or more functions of an initial AMF, a target AMF, or an AUSF as described herein, e.g., with respect to FIGS. 7, 8, 9, and/or 10). This discussion is equally applicable to the processing node 1200 of FIG. 12 where the modules 1300 may be implemented at one of the processing nodes 1200 or distributed across multiple processing nodes 1200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by an initial AMF for a AMF re-allocation procedure, the method comprising: receiving (7000; 8000; 9000; 10000) a registration request for a UE from a Radio Access Network, RAN; deciding (7004b-7006b; 8006-8010; 9004b-9006b; 10006-10010) to initiate an AMF re-allocation procedure by forwarding the registration request to a target AMF via the RAN; sending (7012; 8014; 9012; 10012) the registration request to the RAN for delivery to the target AMF; and sending (7010; 8012; 9016; 10016) a UE security context of the UE to another Network Function, NF.

Embodiment 2: The method of embodiment 1 wherein sending (7010; 8012; 9016; 10016) the UE security context of the UE to the other NF comprises storing (7010; 8012) the UE security context of the UE at the other NF.

Embodiment 3: The method of embodiment 2 wherein storing (7010; 8012) the UE security context of the UE at the other NF comprises storing (7010; 8012), at the other NF, the UE security context of the UE and information that indicates a set of AMFs that can serve one or more network slices requested by the UE (e.g., one or more subscribed network slices of the UE).

Embodiment 4: The method of embodiment 3 wherein sending (7012; 8014; 9012; 10012) the registration request to the RAN for delivery to the target AMF comprises sending (7012; 8014), to the RAN for delivery to the target AMF, the registration request together with the information that indicates the set of AMFs.

Embodiment 5: The method of embodiment 2 wherein storing (7010; 8012) the UE security context of the UE at the other NF comprises storing (7010; 8012), at the other NF, the UE security context of the UE and a token.

Embodiment 6: The method of embodiment 5 wherein sending (7012; 8014; 9012; 10012) the registration request to the RAN for delivery to the target AMF comprises sending (7012; 8014), to the RAN for delivery to the target AMF, the registration request together with token.

Embodiment 7: The method of any one of embodiments 2 to 6 wherein sending (7012; 8014) the registration request to the RAN for delivery to the target AMF comprises sending (7012; 8014), to the RAN for delivery to the target AMF, the registration request together with information that identifies the other NF.

Embodiment 8: The method of embodiment 1 the method further comprises, in response to sending (9012; 10012) the registration request to the RAN for delivery to the target AMF, receiving (9014; 10014), from the RAN, a message comprising a pointer to the target AMF; wherein sending (9016; 10016) the UE security context of the UE to the other NF comprises sending (9016; 10016), to the other NF, the UE security context of the UE and the pointer to the target AMF.

Embodiment 9: The method of any one of embodiments 1 to 8 wherein the other NF is an AUSF.

Embodiment 10: A method performed by a target AMF for a AMF re-allocation procedure, the method comprising: receiving (7014; 8014; 9018; 10012) a message from a Radio Access Network, RAN, wherein the message comprises a registration request from a UE; and obtaining (7016; 8016; 9020; 10018) a UE security context of the UE from a Network Function, NF, other than an initial AMF for the AMF re-allocation procedure; and performing (7018; 8018; 9024; 10020) protected NAS signaling using the UE security context of the UE.

Embodiment 11: The method of embodiment 10 wherein obtaining (7016; 8016; 9020; 10018) the UE security context of the UE from the NF comprises fetching (7010; 8012) the UE security context of the UE from the other NF.

Embodiment 12: The method of embodiment 11 wherein the message received from the RAN comprises information that identifies the NF, and fetching (7010; 8012) the UE security context of the UE from the other NF comprises fetching (7010; 8012) the UE security context of the UE from the other NF using the information that identifies the NF.

Embodiment 12A: The method of embodiment 11 or 12 further comprising obtaining a token from the RAN, and using the token to validate the UE security context of the UE.

Embodiment 13: The method of embodiment 10 wherein obtaining (9020; 10018) the UE security context of the UE from the NF comprises receiving (7010; 8012) the UE security context of the UE from the other NF via a push mechanism.

Embodiment 14: The method of any one of embodiments 10 to 13 wherein the NF is an AUSF.

Embodiment 15: A method performed by NF for a AMF re-allocation procedure, the method comprising: receiving (7010; 8012; 9016; 10016) a UE security context of a UE from an initial AMF for an AMF re-allocation procedure; and providing (7016; 8016; 9020; 10018) the UE security context of the UE to a target AMF for the AMF re-allocation procedure.

Embodiment 16: The method of embodiment 15 wherein the UE security context of the UE is stored by the NF, and providing (7016; 8016) the UE security context of the UE to the target AMF comprises: receiving (7016; 8016), from the target AMF, a request for the UE security context; and sending (7016; 8016) the UE security context to the target AMF in response to the request.

Embodiment 17: The method of embodiment 16 wherein receiving (7010; 8012; 9016; 10016) the UE security context of the UE from the initial AMF comprises receiving (7010; 8012; 9016; 10016) the UE security context together with information that indicates a set of AMFs that can serve one or more network slices requested by the UE (e.g., one or more subscribed network slices of the UE).

Embodiment 18: The method of embodiment 16 wherein receiving (7010; 8012) the UE security context of the UE from the initial AMF comprises receiving (7010; 8012) the UE security context together with information that indicates a set of AMFs that can serve one or more network slices requested by the UE (e.g., one or more subscribed network slices of the UE) and a token.

Embodiment 19: The method of embodiment 18 wherein the request for the UE context comprises a second token, and the method further comprises validating the request based on a comparison of the token and the second token.

Embodiment 20: The method of embodiment 18 wherein sending (7016; 8016) the UE security context to the target AMF in response to the request comprises sending (7016; 8016) the UE security context together to the target AMF in response to the request.

Embodiment 21: The method of embodiment 15 wherein: receiving (9016; 10016) the UE security context of the UE from the initial AMF comprises receiving (9016; 10016), from the initial AMF, the UE security context of the UE together with a pointer to the target AMF; and providing (9020; 10018) the UE security context of the UE to the target AMF comprises pushing (9020; 10018) the UE security context of the UE to the target AMF using the pointer to the target AMF.

Embodiment 22: The method of any one of embodiments 15 to 21 wherein the NF is an AUSF.

Embodiment 23: A network node adapted to perform the method of any one of embodiments 1 to 22.

Embodiment 24: The network node of embodiment 23 comprising: processing circuitry configured to cause the network node to perform the method of any one of embodiments 1 to 22.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method for Access and Mobility Function, AMF, re-allocation, comprising:
   at an initial AMF:
   receiving a registration request for a User Equipment, UE, from a Radio Access Network, RAN; o deciding to initiate an AMF re-allocation procedure by forwarding the registration request to a target AMF for the AMF re-allocation procedure via the RAN;
   sending the registration request to the RAN for delivery to the target AMF; and
   sending a UE security context of the UE to other Network Function, NF,
   wherein:
   sending the registration request to the RAN for delivery to the target AMF comprises sending, to the RAN for delivery to the target AMF, the registration request together with information that identifies the other NF, and sending the UE security context of the UE to the other NF comprises storing the UE security context of the UE at the other NF;
   at the other NF:
   receiving the UE security context of the UE from the initial AMF; and
   providing the UE security context of the UE to the target AMF for the AMF re-allocation procedure;
   at the target AMF:
   receiving a message from the RAN, wherein the message comprises the registration request from the UE;
   obtaining the UE security context of the UE from the other NF; and
   performing protected NAS signaling related to a registration procedure for the UE using the UE security context of the UE.

2. A method performed by an initial Access and Mobility Function, AMF, for a AMF re-allocation procedure, the method comprising:
receiving a registration request for a User Equipment, UE, from a Radio Access Network, RAN;
deciding to initiate an AMF re-allocation procedure by forwarding the registration request to a target AMF via the RAN;
sending the registration request to the RAN for delivery to the target AMF; and
sending a UE security context of the UE to other Network Function, NF,
wherein:
sending the registration request to the RAN for delivery to the target AMF comprises sending, to the RAN for delivery to the target AMF, the registration request together with information that identifies the other NF, and
sending the UE security context of the UE to the other NF comprises storing the UE security context of the UE at the other NF.

3. The method of claim 2 wherein storing the UE security context of the UE at the other NF comprises storing, at the other NF, the UE security context of the UE and information that indicates a set of AMFs that can serve one or more network slices requested by the UE.

4. The method of claim 3 wherein sending the registration request to the RAN for delivery to the target AMF comprises sending, to the RAN for delivery to the target AMF, the registration request together with the information that indicates the set of AMFs.

5. The method of claim 2 wherein storing the UE security context of the UE at the other NF comprises storing, at the other NF, the UE security context of the UE and a token.

6. The method of claim 5 wherein sending the registration request to the RAN for delivery to the target AMF comprises sending, to the RAN for delivery to the target AMF, the registration request together with token.

7. The method of claim 2 the method further comprises: in response to sending the registration request to the RAN for delivery to the target AMF, receiving, from the RAN, a message comprising a pointer to the target AMF; wherein sending the UE security context of the UE to the other NF comprises sending, to the other NF, the UE security context of the UE and the pointer to the target AMF.

8. A method performed by a target Access and Mobility Function, AMF, for an AMF re-allocation procedure, the method comprising:
receiving a message from a Radio Access Network, RAN, wherein the message comprises a registration request from a User Equipment, UE;
obtaining a UE security context of the UE from a Network Function, NF, other than an initial AMF for the AMF re-allocation procedure; and
performing protected NAS signaling related to a registration procedure for the UE using the UE security context of the UE,
wherein:
the message received from the RAN comprises information that identifies the NF, and fetching the UE security context of the UE from the other NF comprises fetching the UE security context of the UE from the NF using the information that identifies the NF; and obtaining the UE security context of the UE from the NF comprises fetching the UE security context of the UE from the NF.

9. The method of claim 8 further comprising obtaining a token from the RAN, and using the token to validate the UE security context of the UE.

10. The method of claim 8 wherein obtaining the UE security context of the UE from the NF comprises receiving the UE security context of the UE from the other NF via a push mechanism.

11. A method performed by Network Function, NF, for an Access and Mobility Function, AMF, re-allocation procedure, the method comprising:
receiving a User Equipment, UE, security context of a UE from an initial AMF for an AMF re-allocation procedure; and
providing the UE security context of the UE to a target AMF for the AMF re-allocation procedure, wherein:
message that the target AMF received from the initial AMF via RAN comprises a registration request from the UE and information that identifies the NF, and fetching the UE security context of the UE from the NF comprises fetching the UE security context of the UE from the NF using the information that identifies the NF; and obtaining the UE security context of the UE from the NF comprises fetching the UE security context of the UE from the NF.

12. The method of claim 11 wherein the UE security context of the UE is stored by the NF, and providing the UE security context of the UE to the target AMF comprises: receiving, from the target AMF, a request for the UE security context; and sending the UE security context to the target AMF in response to the request.

13. The method of claim 12 wherein receiving the UE security context of the UE from the initial AMF comprises receiving the UE security context together with information that indicates a set of AMFs that can serve one or more network slices requested by the UE.

14. The method of claim 12 wherein receiving the UE security context of the UE from the initial AMF comprises receiving the UE security context together with information that indicates a set of AMFs that can serve one or more network slices requested by the UE and a token.

15. The method of claim 14 wherein the request for the UE context comprises a second token, and the method further comprises validating the request based on a comparison of the token and the second token.

16. The method of claim 11 wherein: receiving the UE security context of the UE from the initial AMF comprises receiving, from the initial AMF, the UE security context of the UE together with a pointer to the target AMF; and providing the UE security context of the UE to the target AMF comprises pushing the UE security context of the UE to the target AMF using the pointer to the target AMF.

* * * * *